US009719771B2

(12) United States Patent
Ausserlechner

(10) Patent No.: US 9,719,771 B2
(45) Date of Patent: Aug. 1, 2017

(54) ROTATION ANGLE SENSOR FOR ABSOLUTE ROTATION ANGLE DETERMINATION EVEN UPON MULTIPLE REVOLUTIONS

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 1208 days.

(21) Appl. No.: 13/765,118

(22) Filed: Feb. 12, 2013

(65) Prior Publication Data
US 2013/0218517 A1   Aug. 22, 2013

(30) Foreign Application Priority Data

Feb. 16, 2012   (DE) .......................... 10 2012 202 404

(51) Int. Cl.
  G01B 7/30   (2006.01)
  G01D 5/12   (2006.01)
  G01D 5/245   (2006.01)

(52) U.S. Cl.
  CPC ................. G01B 7/30 (2013.01); G01D 5/12 (2013.01); G01D 5/2451 (2013.01)

(58) Field of Classification Search
  CPC ....................................................... G01B 7/30
  USPC ....................................................... 702/151
  See application file for complete search history.

(56) References Cited

U.S. PATENT DOCUMENTS

| 6,894,487 B2 | 5/2005 | Kunz-Vizenetz |
| 8,884,611 B2 | 11/2014 | Hunger |
| 2005/0127901 A1* | 6/2005 | Johnson ................. G01D 5/147 324/207.2 |
| 2009/0102460 A1 | 4/2009 | Schott et al. |
| 2010/0163333 A1* | 7/2010 | Patil ................... B62D 15/0215 180/402 |

(Continued)

FOREIGN PATENT DOCUMENTS

| DE | 19722016 A1 | 12/1998 |
| DE | 10334869 B3 | 9/2004 |

(Continued)

Primary Examiner — Sujoy Kundu
(74) Attorney, Agent, or Firm — Eschweiler & Potashnik, LLC

(57) ABSTRACT

A rotation angle sensor for detecting an absolute rotation angle upon single or multiple revolutions includes a magnetic field sensor and an encoder arrangement. The magnetic field sensor detects at least two orthogonal magnetic field variables. The encoder arrangement is rotatable depending on the absolute rotation angle relative to the magnetic field sensor, such that the magnetic field detected by the magnetic field sensor is dependent on a relative angular position of the encoder arrangement with respect to the magnetic field sensor. The encoder arrangement is furthermore displaceable relative to the magnetic field sensor. The relative angular position and the relative translational position of the encoder arrangement with respect to the magnetic field sensor is determined from the at least two orthogonal magnetic field variables. The absolute rotation angle is determined by means of the relative angular position and the relative translational position.

31 Claims, 12 Drawing Sheets

(56) References Cited

U.S. PATENT DOCUMENTS

2013/0268234 A1* 10/2013 Janisch .................. G01B 7/30
 702/151
2014/0167745 A1* 6/2014 Held .................. G01B 21/045
 324/207.12

FOREIGN PATENT DOCUMENTS

| DE | 102005043301 A1 | 3/2006 |
|----|-----------------|--------|
| EP | 2028450 A2 | 2/2009 |
| EP | 2354769 A1 | 8/2011 |
| JP | 2009271054 A | 11/2009 |
| JP | 2010008359 A | 1/2010 |

\* cited by examiner

ROTATION ANGLE SENSOR FOR ABSOLUTE ROTATION ANGLE DETERMINATION EVEN UPON MULTIPLE REVOLUTIONS

CROSS-REFERENCE TO RELATED APPLICATION

This Application is related, and claims priority, to German Patent Application Number 10 2012 202 404.2 filed on Feb. 16, 2012, entitled "Rotation Angle Sensor for Absolute Rotation Angle Determination Even Upon Multiple Revolutions" and is hereby incorporated by reference.

FIELD

Example embodiments of the present disclosure provide a rotation angle sensor for detecting an absolute rotation angle upon single or multiple revolutions. Further example embodiments provide a rotation angle sensor having the possibility of ascertaining/monitoring tolerance deviations. Further example embodiments of the present disclosure provide a method for determining an absolute rotation angle.

BACKGROUND

For many applications it is necessary to measure angles which have an angular separation of more than 360°, that is to say that it is necessary to perform more than one full revolution in order to pass from one angle to the other angle. Examples of such applications are found e.g. in automotive technology if the current steering wheel position is intended to be determined for an electric steering system or servo steering. Further applications are found for example in robot technology and in lifting technology (cranes, elevators, forklift trucks, etc.), in which e.g. a cable drum or winch can rotate over a range of a plurality of revolutions.

In the case of a rotation angle sensor that yields an absolute rotation angle as an output value, the absolute rotation angle is typically determined directly on the basis of a current configuration or internal position of the rotation angle sensor. In contrast thereto, differential rotation angle sensors or relative rotation angle sensors measure the absolute value and, if appropriate, the direction of a rotational movement, such that generally it is necessary firstly to move to a known reference angle, from which other angles can be determined by a difference formation. However, even small inaccuracies add up in the relative rotation angle determination, particularly if multiple revolutions are carried out.

Many absolute angle sensors currently used have a permanent magnet, which is fixed to an end of a shaft, and a magnetic field sensor positioned in an extension of the shaft axis. When the shaft rotates, the magnetic field of the permanent magnet also rotates relative to the magnetic field sensor, which is itself stationary. The sensor detects the magnetic field and derives the rotation angle therefrom. Such systems can use horizontal Hall sensors (HHall devices) or vertical Hall sensors (VHall devices) or magnetoresistive sensors such as GMR sensors (giant magneto-resistors) or AMR sensors (anisotropic magneto-resistors) or more exotic XMR sensors (wherein the abbreviation XMR serves as an umbrella term for the technical know-how based on the magnetoresistance effects AMR, GMR, TMR, CMR and GMI) or combinations thereof. They can detect angles of between 0° and 360°. With absolute magnetic angle sensors of this type it is difficult to create an arrangement having a through shaft, i.e. if the sensor has to be positioned eccentrically with respect to, instead of on or in an extension of, the axis of rotation.

Many differential or relative magnetic angle sensors currently used have a measuring wheel having a multiplicity of permanent-magnetized north and south poles or are made from soft-magnetic material having teeth and notches. The sensor element(s) is/are positioned near the circumference of the wheel (slightly offset with a gap either in a radial direction or in an axial direction; this is called an air gap). All the abovementioned sensor technologies can also be used for these types of rotation angle sensors. They usually detect fluctuations of the magnetic field when the wheel rotates. An algorithm detects the extrema of this pattern and derives switching points therefrom: the switching points are typically average values of preceding maxima and minima. If e.g. 60 north and south poles (i.e. p=60 pole pairs) are arranged along the circumference of the wheel, the sensor angle can resolve increments of 360°/60/2=3°, that is to say a half-period. In principle, it is possible to interpolate between each increment, since the field variation is typically sinusoidal. However, the absolute angular accuracy is often reduced by inaccurate magnetization patterns or insufficient sensitivity of the sensor element or insufficient robustness toward external magnetic disturbances in the case of large air gaps (in particular for small magnetic domains, which means a large value for the number of pole pairs p).

In all the abovementioned cases of absolute angle sensors, the range of the detectable angles is at most 360°. If a plurality of revolutions are intended to be detected, some rotation angle sensors currently used use gear mechanisms which copy the rotation of the shaft onto two shafts having different rotational speeds. Each of the two shafts has its own magnet with its allocated sensor and both sensor signals are compared in order to determine the absolute angle. If the transmission or reduction ratio of the two magnets is 1:5, for example, it is possible to detect angles in a range of 5*360°, but if the transmission or reduction ratio is large, even small errors of the two angle sensors can produce large errors in the absolute angle, which can reach a multiple of 360°. Such systems are bulky and costly on account of the gear mechanisms and it is typically not possible to make them very small, since this would lead to a magnetic crosstalk between the two sensor systems, for which there is no simple possibility of correction.

It would be desirable to have available an absolute angle sensor which can be mounted in configurations with a through shaft and which can detect angular ranges of up to a plurality of revolutions. It would also be desirable to provide a rotation angle sensor which makes it possible to ascertain or monitor whether a tolerance range relevant to an accuracy of the rotation angle measurement has been complied with or departed from.

SUMMARY

Example embodiments of the present disclosure provide a rotation angle sensor for detecting an absolute rotation angle upon single or multiple revolutions with respect to an axis of rotation. The rotation angle sensor comprises a magnetic field sensor and an encoder arrangement. The magnetic field sensor is configured to detect at least two orthogonal variables of a magnetic field. The variables can be angle, absolute value or signed absolute value of the magnetic field detected by the magnetic field sensor. The encoder arrangement is rotatable depending on the absolute rotation angle relative to the magnetic field sensor about the axis of rotation, such that the magnetic field detected by the magnetic field sensor is dependent on a relative angular position of the encoder arrangement with respect to the magnetic field sensor. At least one other component orthogonal with respect thereto is dependent on a relative translational position of the encoder arrangement with respect to the magnetic field sensor. By way of example, one component of the magnetic field can predominantly represent the rotational position, while at least one other component of the magnetic field predominantly reproduces the translational position. The relative angular position and the relative translational position of the encoder arrangement with respect to the magnetic field sensor can be determined from the at least two orthogonal variables of the magnetic field that are detected by the magnetic field sensor. Furthermore, the absolute rotation angle can then be determined by means of the relative angular position and the relative translational position.

In accordance with alternative example embodiments, the rotation angle sensor comprises a magnetic field sensor configured to detect at least two orthogonal variables (angle, absolute value, signed absolute value, etc.) of a magnetic field and an encoder arrangement having at least four encoder elements. The encoder arrangement is rotatable depending on the absolute rotation angle relative to the magnetic field sensor about the axis of rotation, such that at least one component of the magnetic field acting on the magnetic field sensor is dependent on a relative angular position and at least one other magnetic field component orthogonal with respect thereto is dependent on a relative translational position of the encoder arrangement with respect to the magnetic field sensor. The relative angular position and the relative translational position of the encoder arrangement with respect to the magnetic field sensor can be determined from the at least two orthogonal variables of the magnetic field that are detected by the magnetic field sensor. The absolute rotation angle can subsequently be determined by means of the relative angular position and the relative translational position.

Further example embodiments provide a method for determining an absolute rotation angle which comprises receiving a first sensor signal and a second sensor signal from a magnetic field sensor, determining a relative translational position of an encoder arrangement with respect to the magnetic field sensor, determining a relative angular position of the encoder arrangement with respect to the magnetic field sensor, and determining the absolute rotation angle based on the relative translational position determined or established and the relative angular position determined or established. The first sensor signal and the second sensor signal represent two orthogonal variables (angle, absolute value or signed absolute value, etc.) of a magnetic field detected by the magnetic field sensor. Determining the relative translational position is effected by evaluating the first sensor signal. Determining the relative angular position is effected by evaluating at least the first sensor signal and the second sensor signal.

Example embodiments are based on the fact that two orthogonal variables of a magnetic field detected or measured substantially at one location react differently to a change in the relative angular position between the magnetic field sensor and the encoder arrangement or a change in the relative translational position between these two component parts. By virtue of the fact that both variables belong to the same magnetic field and are detected or measured by the magnetic field sensor substantially at the same physical location, it is possible to eliminate or at least reduce many problems associated e.g. with mounting tolerances of two magnetic field sensors fitted at different locations. Furthermore, in the calculations to be carried out, some parameters affected by tolerances and/or aging cancel one another out, such that an inaccuracy or change in these parameters has (virtually) no influence on the result. By way of example, all the variables of the magnetic field have a (substantially) linear dependence on a magnetic remanence or remanent flux density of a permanent magnet used for generating the magnetic field. Consequently, an aging-governed change in the remanence, for example, equally affects the strength or amplitude of the three variables of the magnetic field.

An arrangement in which the magnetic field sensor and the encoder arrangement are offset with respect to one another in a radial direction makes it possible to combine the proposed rotation angle sensor with a through axis arrangement in a simple manner. Furthermore, such an arrangement can be realized in a relatively space-saving manner and a gear mechanism possibly present for producing the translational relative movement between magnetic field sensor and encoder arrangement can be realized in a relatively simple manner.

If the encoder arrangement comprises a multipole wheel, as is provided in some example embodiments, example embodiments are distinguished by the fact that at least one of the two orthogonal variables of the magnetic field changes depending on the relative translational position. In this way, a possible ambiguity within the relative angular position, which can be attributed to the sector-type subdivision of the multipole wheel into identical or similar sections, can be resolved by using the variable(s) dependent on the relative translational position. Accordingly, such example embodiments, too, manifest the property that the two orthogonal variables of the magnetic field firstly are generated or influenced by the same elements and secondly are detected by one magnetic field sensor substantially at the same location. The detection of the two variables of the magnetic field by one magnetic field sensor suitable therefor in this case makes possible a good comparability of the measured values of the at least two orthogonal variables, since the magnetic field sensor can be manufactured, for example, by means of a microelectronic production method (e.g. CMOS process or the like), with very high precision and even external parameters such as supply voltage, temperature, etc. for the entire magnetic field sensor are substantially identical.

Consequently, an absolute angle sensor is presented which can be mounted in a through shaft configuration and which can detect angular ranges of up to a plurality of revolutions. Such a rotation angle sensor is diverse in the sense that it uses a sensor circuit for detecting two or more variables of a magnetic field, whereas the magnetic measuring wheel and a possible gear mechanism can be optimized for different geometrical and magnetic boundary conditions.

In some example embodiments, the rotation angle sensor can comprise evaluation electronics for determining the relative angular position and the relative translational position from the at least two orthogonal variables detected by the magnetic field sensor. The evaluation electronics can furthermore be used for determining the absolute rotation angle from the relative angular position and the relative translational position.

In accordance with further example embodiments, the encoder arrangement can comprise at least four encoder elements, such that the encoder arrangement has at least two magnetic periods in a circumferential direction. If the encoder arrangement comprises an (active) multipole wheel, then this means that the multipole wheel has at least two north and two south poles that are arranged alternately in a circumferential direction of the multipole wheel. In the case of a passive encoder arrangement, which is excited e.g. by a back-bias magnet, an encoder element generally corresponds to a tooth or a notch, such that two teeth and two notches are to be provided in the case of the at least four required encoder elements. The number of encoder elements can also be higher and comprise, for example, up to 80 encoder elements (i.e. 40 pole pairs or tooth-notch pairs). In particular 10 to 60 encoder elements (i.e. 5 to 30 encoder element pairs) are appropriate for many applications. In the case of a passive encoder arrangement, the wheel is typically soft-magnetic (that is to say that it has a high relative permeability).

In accordance with further example embodiments, an air gap can separate the encoder arrangement and the magnetic field sensor from one another at least in a radial direction (relative to the axis of rotation). The air gap thus has to be traversed at least in a radial direction in order to pass from the encoder arrangement to the magnetic field sensor. The magnetic field sensor can be arranged radially outside the encoder arrangement or else radially inside (in the case of a ring-shaped encoder arrangement).

Depending on the example embodiment, the translational relative movement between the encoder arrangement and the magnetic field sensor can be effected in an axial direction, in a radial direction or both in an axial direction and in a radial direction. A transmission ratio between the absolute rotation angle and the translational relative movement can be predetermined and therefore used for the evaluation of the sensor signals supplied by the magnetic field sensor.

In accordance with further example embodiments, the rotation angle sensor can comprise a gear mechanism for producing the relative translational position of the encoder arrangement with respect to the magnetic field sensor depending on the absolute rotation angle. The gear mechanism can be, in particular, a spindle drive, a helical gear mechanism, a spiral gear mechanism, an eccentric gear mechanism, a connecting rod gear mechanism or a crank gear mechanism. Alternatively, a gear mechanism already present anyway can be used or adapted.

In accordance with further example embodiments, the magnetic field sensor can comprise a semiconductor chip, which comprises a first sensor element for a first variable of the magnetic field and a second sensor element for a second variable of the magnetic field.

In further example embodiments, the magnetic field sensor can be designed to implement a differential measurement principle. For this purpose, the magnetic field sensor can have in each case two sensor elements for each variable of the magnetic field to be detected, the sensor elements being arranged in a manner spaced apart from one another. The spacing between two sensor elements of this type can extend in particular in the direction of a relative movement between magnetized segments of the encoder arrangement and the magnetic field sensor, for example along the circumferential direction of the relative rotational movement between encoder arrangement and magnetic field sensor. Alternatively, the spacing of the two sensor elements can also be oriented in other directions, e.g. one sensor element can be situated nearer to the magnet wheel and the other further away. With such an arrangement designed for a differential measurement principle, the rotation angle sensor can be made more robust relative to external magnetic disturbances.

BRIEF DESCRIPTION OF THE DRAWINGS

Example embodiments of the present disclosure are described in greater detail below with reference to the accompanying Figs., in which:

FIG. 5 shows a function graph of a second variable of the magnetic field and of the translational position as a function of the absolute rotation angle for the same rotation angle sensor on which FIG. 4 is also based;

DETAILED DESCRIPTION

Before example embodiments are explained below with reference to the accompanying Figs., it is pointed out that identical elements or elements having an identical function are provided with the same reference signs, and that a repeated description of the elements is dispensed with. The descriptions of elements having the same reference signs are therefore mutually interchangeable. One feature or a plurality of features of one example embodiment can be combined with one feature or a plurality of features of another example embodiment or can be replaced thereby.

Figure 1:
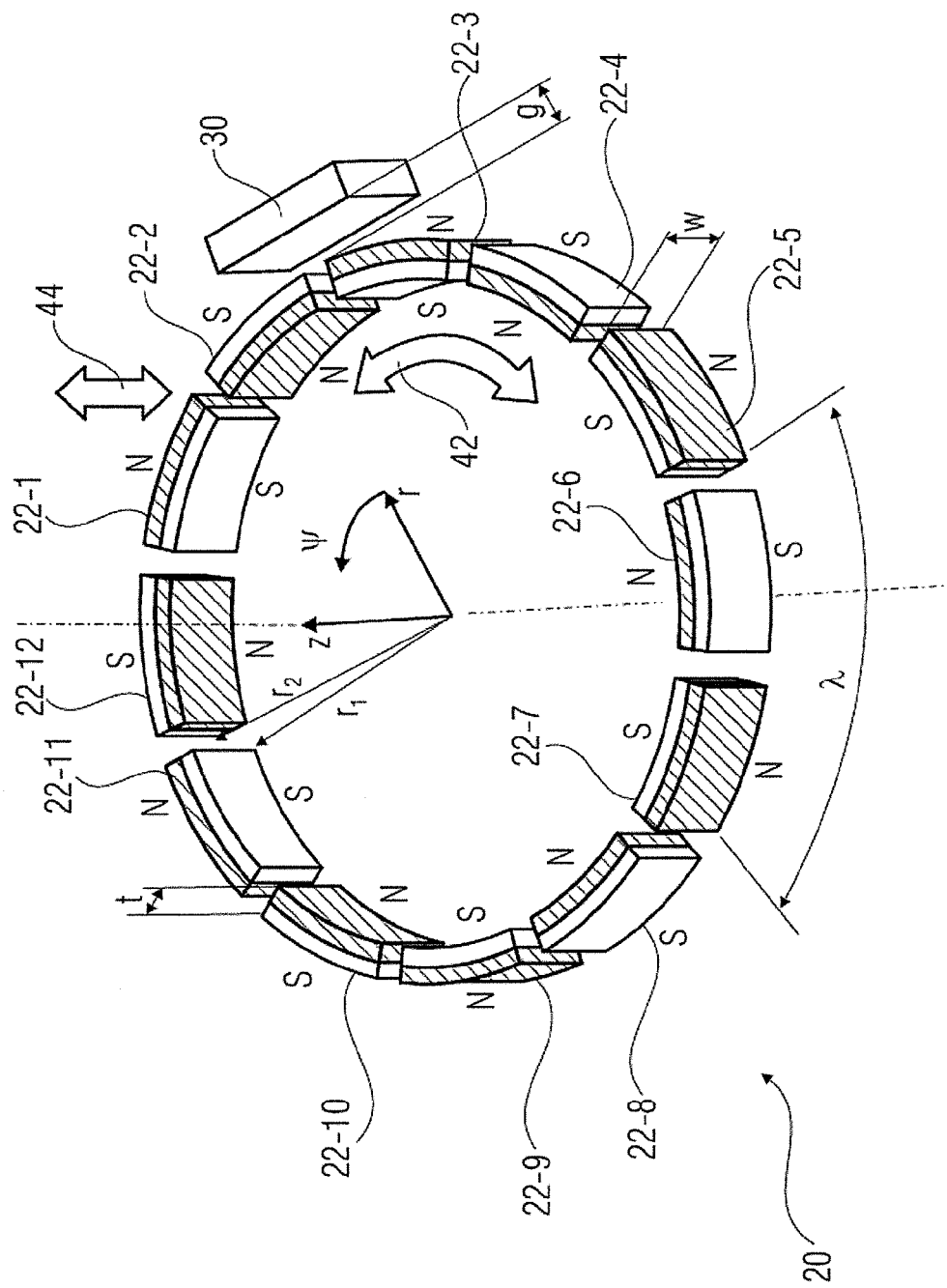
FIG. 1 shows a perspective, schematic basic drawing of a rotation angle sensor in accordance with example embodiments.

FIG. 1 shows a perspective, schematic basic illustration of a rotation angle sensor in accordance with one or more possible example embodiments. The rotation angle sensor comprises a magnetic field sensor 30 and an encoder arrangement 20. The encoder arrangement 20 comprises a multiplicity of encoder elements 22-1 to 22-12. In the example embodiment illustrated in FIG. 1, each encoder element 22-1 to 22-12 corresponds to a permanent magnet whose magnetization direction runs in a radial direction of the encoder arrangement 20. The multiplicity of encoder elements 22-1 to 22-12 are arranged circumferentially, such that two adjacent encoder elements have opposite magnetization directions. The encoder arrangement 20 is rotationally symmetrical with respect to an axis of rotation extending parallel to a z-direction of a cylindrical coordinate system. The axis of rotation of the encoder arrangement 20 is typically chosen such that it corresponds to the z-axis of the cylindrical coordinate system. A radial direction of the cylindrical coordinate system is designated by r and a tangential direction of the cylindrical coordinate system is designated by $\psi$. The multiplicity of encoder elements 22-1 to 22-12 is arranged in a ring-shaped fashion with respect to the z-axis, wherein an internal diameter of the ring is designated by $r_1$ and an external diameter of the ring is designated by $r_2$. Accordingly, the ring has a thickness $t=r_2-r_1$ in a radial direction. In an axial direction, i.e. parallel to the z-direction, the encoder arrangement 20 or each encoder element 22-1 to 22-12 extends over a height w. Two adjacent encoder elements in each case form an encoder element pair which defines a magnetic period $\lambda$. FIG. 1 shows one such magnetic period $\lambda$ comprising the encoder elements 22-6 and 22-7. The magnetic period $\lambda$ thus corresponds to a magnet pole pair. The configuration shown in FIG. 1 has 12 encoder elements and accordingly six encoder pole pairs or magnet pole pairs. Since the magnetic field is repeated periodically in the circumferential direction in accordance with the magnetic period, the encoder arrangement has six sectors of 60° in each case.

In the example embodiment illustrated in FIG. 1, the magnetic field sensor 30 is arranged substantially at the same level in the z-direction as the encoder arrangement 20. However, the magnetic field sensor 30 is offset radially with respect to the encoder arrangement 20, since it is arranged radially outside the encoder arrangement 20. Consequently, the magnetic field sensor 30 is at a distance from the axis of rotation (i.e. the z-axis) that is greater than the radius $r_2$ of the outer ring of the encoder arrangement 20. In particular, the magnetic field sensor 30 is separated from the encoder arrangement 20 by an air gap having a radial extent designated by g. The air gap or the air gap width can be defined, for example, as the smallest distance between the sensor element and the magnet segments (encoder elements) in the magnetization direction.

The encoder arrangement 20 is rotatable depending on the absolute rotation angle relative to the magnetic field sensor 30 about the axis of rotation, this being indicated by the arrow 42. Furthermore, the encoder arrangement 20 is displaceable translationally relative to the magnetic field sensor 30, this being indicated by the arrow 44 in FIG. 1. The translational displaceability can be intentional and brought about by a suitable gear mechanism, for example. Alternatively, however, an unintentional translational displacement can also occur on account of bearing play or assembly tolerances. The relative translational displacement between encoder arrangement 20 and magnetic field sensor 30 is effected in the direction of the z-axis, i.e. in an axial direction, in the example embodiment illustrated. As an alternative thereto, however, other forms of a translational, relative displacement are also conceivable, such as in a specific radial direction, for example. The specific radial direction can pass e.g. through the magnetic field sensor 30, such that the encoder arrangement 20 and the magnetic field sensor 30 move toward one another or move away from one another relatively depending on the absolute rotation angle. For the air gap between the encoder arrangement 20 and the magnetic field sensor 30, this would mean that its radial extent g changes during the operation of the rotation angle sensor depending on the absolute rotation angle.

In the example embodiment shown in FIG. 1 and in further example embodiments, use is made of a measuring wheel (gearwheel or target wheel) and at least two types of magnetic field sensors which detect two variables (e.g. direction components) of the magnetic field. The two direction components are (linearly) independent of one another and can be chosen to be, in particular, orthogonal with respect to one another. For the purpose of simplified illustration and explanation, hereinafter principally mulipolar permanent-magnetic code wheels are shown and described, although the principle also functions for encoder arrangements composed of magnetically active material which are shaped in such a way that they influence the magnetic field detected by the magnetic field sensor 30 depending on the relative angular position and the relative translational position between the encoder arrangement 20 and the magnetic field sensor 30. In particular, it is possible to use soft-magnetic wheels composed of steel, iron or other ferromagnetic materials in the context of the encoder arrangement 20 which have e.g. teeth and notches. Such passive encoder arrangements can interact with back-bias magnets in order to excite the magnetic field sensor 30.

FIG. 1 can also be interpreted as follows. FIG. 1 shows a customary multipole-magnetic encoder ring such as is used e.g. for detecting a wheel speed in automotive engineering. The axis of the ring is identical to the axis of rotation, which is furthermore also the z-axis. The axial plane of symmetry is at z=0. Consequently, the individual encoder elements or segments extend from z=−w/2 to z=+w/2, where w is the axial width of the ring. The ring comprises two 2p segments (illustrated in FIG. 1 for p=6) having the thickness t in a radial direction, which are arranged on the circumference of a ring having an internal diameter $2r_1$ and an external diameter $2r_2=2r_1+2t$. Each of the segments is magnetized in a radial direction, but with an alternating sign for adjacent segments. The magnetic north and south poles are identified by N and S, respectively. Between two magnetized regions there is a narrow wedge where the material is not magnetized—this wedge ideally has a negligible width.

Figure 2:
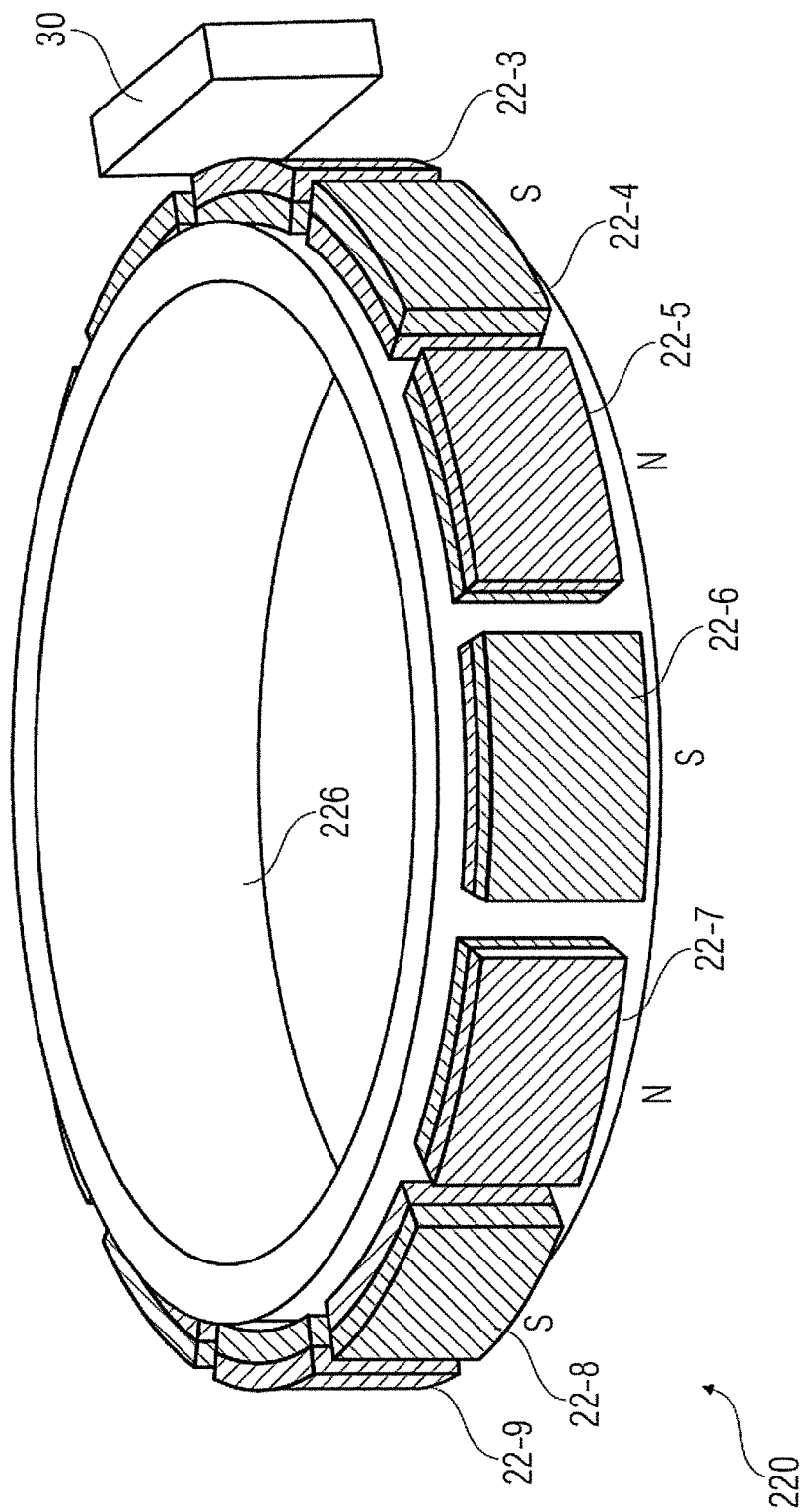
FIG. 2 shows a perspective, schematic basic illustration of a rotation angle sensor in accordance with further example embodiments.

In practice, such a code ring of the encoder arrangement is often mounted on a steel mount, as is shown in FIG. 2. FIG. 2 thus shows an alternative example embodiment of the encoder arrangement 220. In this case, the steel mount is embodied as a steel sleeve or steel ring 226. With regard to the magnetic field, the highly permeable steel sleeve (having a relative permeability of $\mu_r>1000$) behaves like a magnetic mirror: it virtually doubles the thickness of the permanent-magnetized segments (that is to say that t becomes 2*t). Instead of the steel mount 226, the rotating shaft whose rotation angle is to be determined (e.g. the steering column) can also be used.

Some example embodiments can also be summarized as follows. A permanent-magnetic multipole wheel can be mounted onto a shaft or onto a part kinematically coupled to the shaft (by means of articulated shafts or threads, coupling, etc.), such that upon rotation of the shaft the multipole wheel moves rotationally and also translationally with respect to a sensor chip (more precisely: the multipole wheel has north and south poles threaded periodically on a circle circumference. The relative movement between multipole strip and sensor proceeds such that there is a movement component in this longitudinal direction of the threading and a movement component transversely with respect to the threading direction and no movement component (i.e. fixed distance=fixed air gap) perpendicular to the two aforementioned directions). If we call the longitudinal direction of the threading the psi-direction and the movement direction perpendicular thereto the z-direction, then the distance in the r-direction is intended primarily to remain constant. Furthermore, a signal is obtained from the psi- and/or r-component, and a further signal is obtained from the z-component (advantageously normalized to the psi- and/or r-component). From the combination of both signals it is possible to determine a rotation angle (this can possibly also exceed 360°).

For the translational movement there are, for example, the following two options:
1. The translational movement is effected in an axial direction.
2. Here the multipole wheel looks like a plate, for example—that is to say that it is very thin in the axial direction. There the rotational movement of the shaft could be coupled with an advance in a radial direction by means of a spiral (e.g. a spiral groove). By way of example, the sensor would then move radially from the outside inward, or vice versa. If the multipole segments are arranged in an outer annulus region of the "plate", then the r-component of the magnetic field would be equal to zero approximately in the center between the internal and external radii of the annulus. If the sensor is displaced radially from this center, then that leads to an r-component which rises approximately linearly with the displacement and can therefore again be used as a translational signal. The mechanics for this radial movement is normally more complex than in the first arrangement (axial movement), but it is nevertheless possible.

With regard to the multipole wheel it should be noted that at least two north plus two south poles (that is to say four encoder elements) are present. In one embodiment, 10 to 60 elements can be provided, wherein preferably all elements are of the same size and are intended to be arranged regularly (they are usually mounted on a steel back, which not only provides for dimensional stability, but also increases the magnetic strength owing to its magnetic mirror effect). If a steel back is used, then the segments are typically magnetized perpendicularly to the steel back.

Some example embodiments may provide for there to be no deterministic coupling between rotational movement and axial movement. The sensor again detects two components, from which it determines the rotational and axial position. If the axial position determined leaves a specific permissible range, the sensor can detect this and report a fault. Corresponding example embodiments would thus be identical, on the sensor side, to the joint evaluation of the two orthogonal variables of the magnetic field as explained further above. On the actuator side a difference arises because a helical gear mechanism or the like is not used, but rather only a shaft mounting arrangement, for example. The purpose is therefore not to detect a plurality of revolutions, but rather to report faults in a (differential) sensor system with multipole wheel if the mounting situation becomes too imprecise. This is because, particularly in the case of magnetoresistive (MR) sensors, it is disadvantageous if the sensor is positioned too far outside the center of the pole strip/ring. This case could therefore be identified by the detection of a further magnetic field component and a disturbance or "departure from the safe/reliable measurement range" could be reported.

Figure 3:
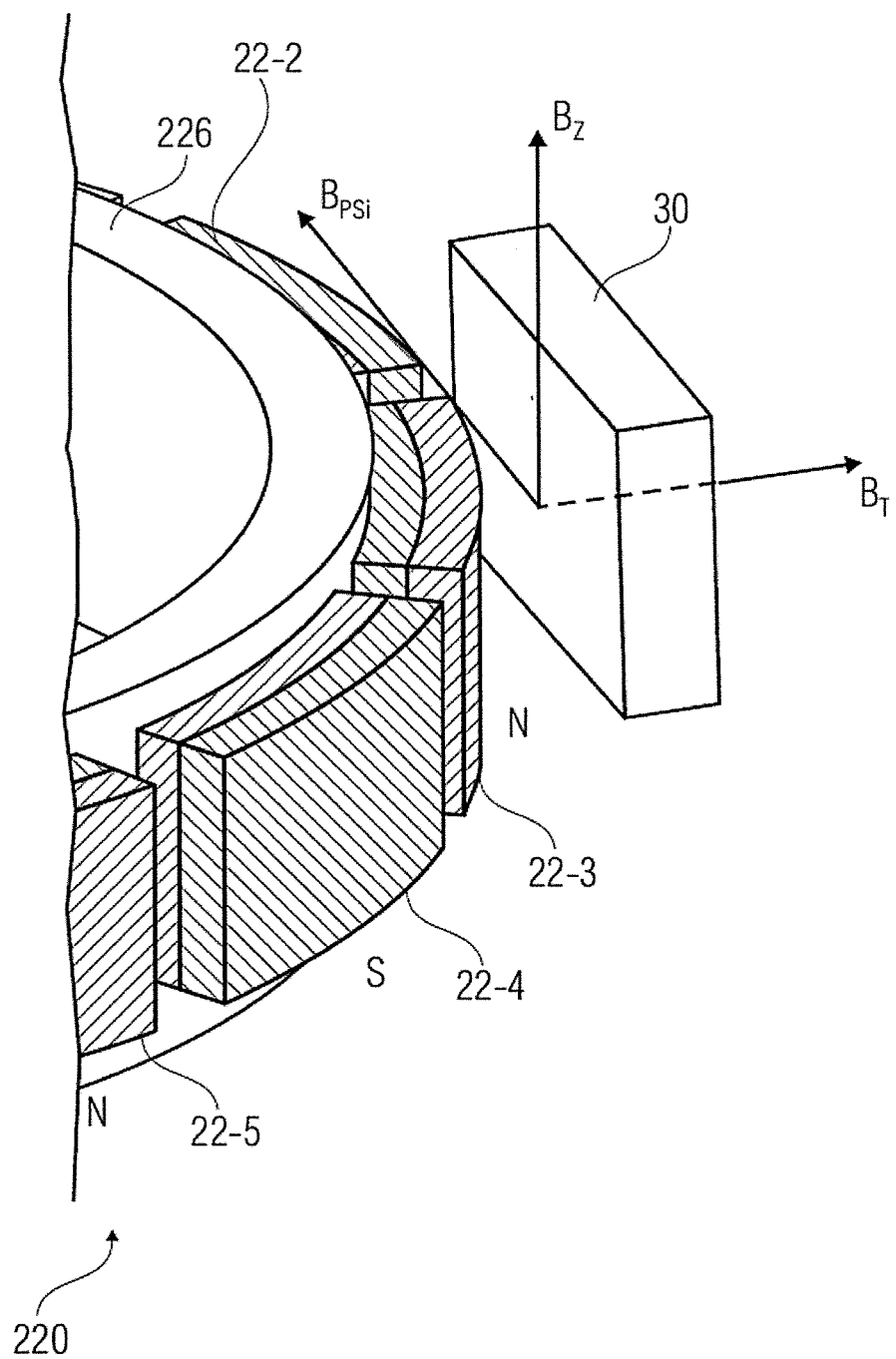
FIG. 3 shows a perspective illustration of a detail excerpt from FIG. 2.

FIG. 3 shows an excerpt from FIG. 2 in order to illustrate the magnetic flux density at the location of the magnetic field sensor 30. The magnetic flux density is designated by B herein. It has three components in cylindrical coordinates, namely Bpsi, Br and Bz. Bpsi and Br are sinusoidal with respect to the $\psi$ coordinate and with an amplitude which decreases exponentially relative to the air gap width and which is only slightly dependent on the z-coordinate. There is a 90° phase shift between Bpsi and Br.

The direction component of the magnetic field in an axial direction Bz vanishes in the plane of symmetry z=0. For z≠0, Bz is also sinusoidal, its amplitude being substantially linear with respect to the z-coordinate as long as $|z|<w/2$ holds true. For $|z|>w/2$, the amplitude of Bz decreases again. Therefore, the Bz amplitude in the vicinity of $|z|=w/2$ (i.e. in the vicinity of the upper/lower edge of the ring) has a maximum that is all the more distinct for small air gaps.

In accordance with example embodiments, a rotational movement of the ring 220 relative to the magnetic field sensor 30 (or a rotational movement of the magnetic field sensor 30 relative to the ring 220) is combined with a z-movement between ring and magnetic field sensor. For example, the ring 220 either can effectively move along a thread path or a helical line, or the ring rotates, while the magnetic field sensor 30 moves synchronously in the z-direction. The (peak) amplitudes of the direction components in the radial and tangential directions Br and Bpsi, respectively, are principally dependent on the air gap, whereas the Bz component is also dependent on the z-position, that is to say the relative translational position between encoder arrangement 220 and magnetic field sensor 30. A system for absolute rotation angle determination based on the detected direction components of the magnetic field can then compare the amplitude of the radial magnetic flux density component Br with the amplitude of the axial magnetic flux density component Bz. Alternatively, the amplitude of the tangential magnetic flux density component Bpsi can also be compared with the amplitude of the axial magnetic flux density component Bz. In both cases, the two used direction components of the magnetic field of the magnetic flux density contain enough information with regard to the azimuthal and axial relative positions of the encoder arrangement 220 with respect to the magnetic field sensor 30. The axial position is linked with the number of revolutions. In this way, the system can then finally detect angular positions within a range of a plurality of revolutions.

The dependencies of the different direction components of the magnetic field or of the magnetic flux density on the relative angular position and the relative translational position can be expressed mathematically as follows. Firstly, it should be assumed that the relative azimuthal position is linked with the relative axial position e.g. on account of a corresponding gear mechanism (e.g. spindle drive or threaded bush), such that the following holds true:

$$z=\Delta_z \psi/(2\pi)$$

One relatively simple gear mechanism with which such a movement can be obtained is a shaft whose bearing is a fine thread (thread having a small pitch) that moves the shaft in a defined manner in an axial direction as soon as the shaft is rotated. In some example embodiments, the encoder arrangement is connected to the shaft in a rotationally fixed and translationally fixed manner, such that upon a rotation in the clockwise direction the thread presses the code ring of the encoder arrangement e.g. in the positive z-direction, whereas upon a rotation in the counter-clockwise direction the code ring is pressed in the negative z-direction. If it is then stipulated as a reference position that at an absolute rotation angle ψ=0 the encoder arrangement is symmetrical with respect to the axial plane of symmetry, i.e. is situated at z=0, then for a pitch $\Delta_z$ of the thread and for a rotational angle ψ=π/2, this results in an axial position of z=$\Delta_z$/4. At ψ=π, z=$\Delta_z$/2; at ψ=2π, z=$\Delta_z$; at ψ=4π, z=2$\Delta_z$, at ψ=6π, z=3$\Delta_z$, etc.

The direction components of the magnetic field or of the magnetic flux density or of the magnetic induction are, expressed in cylindrical coordinates:

$$B_\psi = \hat{B}_\psi \sin(p\psi)$$

$$\hat{B}_\psi = \frac{4B_{rem}}{\pi}\sinh\left(\frac{\pi t}{2}\right)\cos\left(lf\frac{\pi}{2}\right)\exp\left(-\pi\frac{2g+t}{\lambda}\right)$$

$$B_r = \hat{B}_r \cos(p\psi)$$

$$\hat{B}_r = \frac{4B_{rem}}{\pi}\sinh\left(\frac{\pi t}{\lambda}\right)\cos\left(\frac{\pi lf}{2}\right)\exp\left(-\pi\frac{2g+t}{\lambda}\right)$$

$$B_z = \hat{B}_z \cos(p\psi)$$

$$\hat{B}_z = \frac{2B_{rem}}{\pi^2}\cos\left(\frac{\pi}{2}lf\right)\left\{\begin{array}{l}K_0\left(\frac{\pi}{\lambda}\sqrt{(2z-w)^2+(2g)^2}\right)-\\K_0\left(\frac{\pi}{\lambda}\sqrt{(2z+w)^2+(2g)^2}\right)\end{array}\right\}$$

wherein $B_{rem}$ is the remanence of the permanent-magnetized segments, p is the number of pole pairs, r is the reading radius (i.e. the distance between the sensor element 30 and the axis of rotation), λ is the magnetic period of the pole wheel 220 (=2πr/p), lf is the percentage of the non-magnetized volume within the ring (excluding steel back), g is the air gap or the width thereof, and $K_0$ is the modified Bessel function. The article "Closed Analytical Formulae for Multi-pole Magnetic Rings" by U. Ausserlechner, published in: Progress In Electromagnetics Research B, Vol. 38, 71-105, 2012, contains on pages 89 and 90 a derivation of the above-indicated analytical solution for the amplitude of the axial magnetic field amplitude B.

It can be seen that Br and Bz are in phase, whereas Bpsi is in quadrature with respect thereto. Furthermore, the amplitudes $\hat{B}_\psi = \hat{B}_r$ are identical. If the sensor elements are not too close to the edge of the code wheel and |z|<w/2, the Bessel function $K_0$ can be approximated by an exponential function.

Accordingly, the axial magnetic field component can be expressed as follows:

$$\hat{B}_z \approx \frac{8B_{rem}}{\pi}\frac{wz}{\sqrt{2\lambda}}\cos\left(\frac{\pi}{2}lf\right)\frac{\exp\left(-\frac{\pi}{\lambda}\sqrt{w^2+(2g)^2}\right)}{(w^2+(2g)^2)^{3/4}}$$

which shows that the Bz amplitude is linearly proportional to the z-coordinate and decreases exponentially with the air gap or the width thereof. The accuracy can be improved by providing look-up tables or interpolation functions f( ) for the relation of z=f($\hat{B}_z/\hat{B}_\psi$) or the relation z=f($\hat{B}_z/\hat{B}_r$). The system can then continue with the calculation of ψ by means of a relationship ψ=f($\hat{B}_z/\hat{B}_\psi$)2π/$\Delta_z$. This result can then be compared relative to a regular grid with intervals 360°/p.

Figure 4:
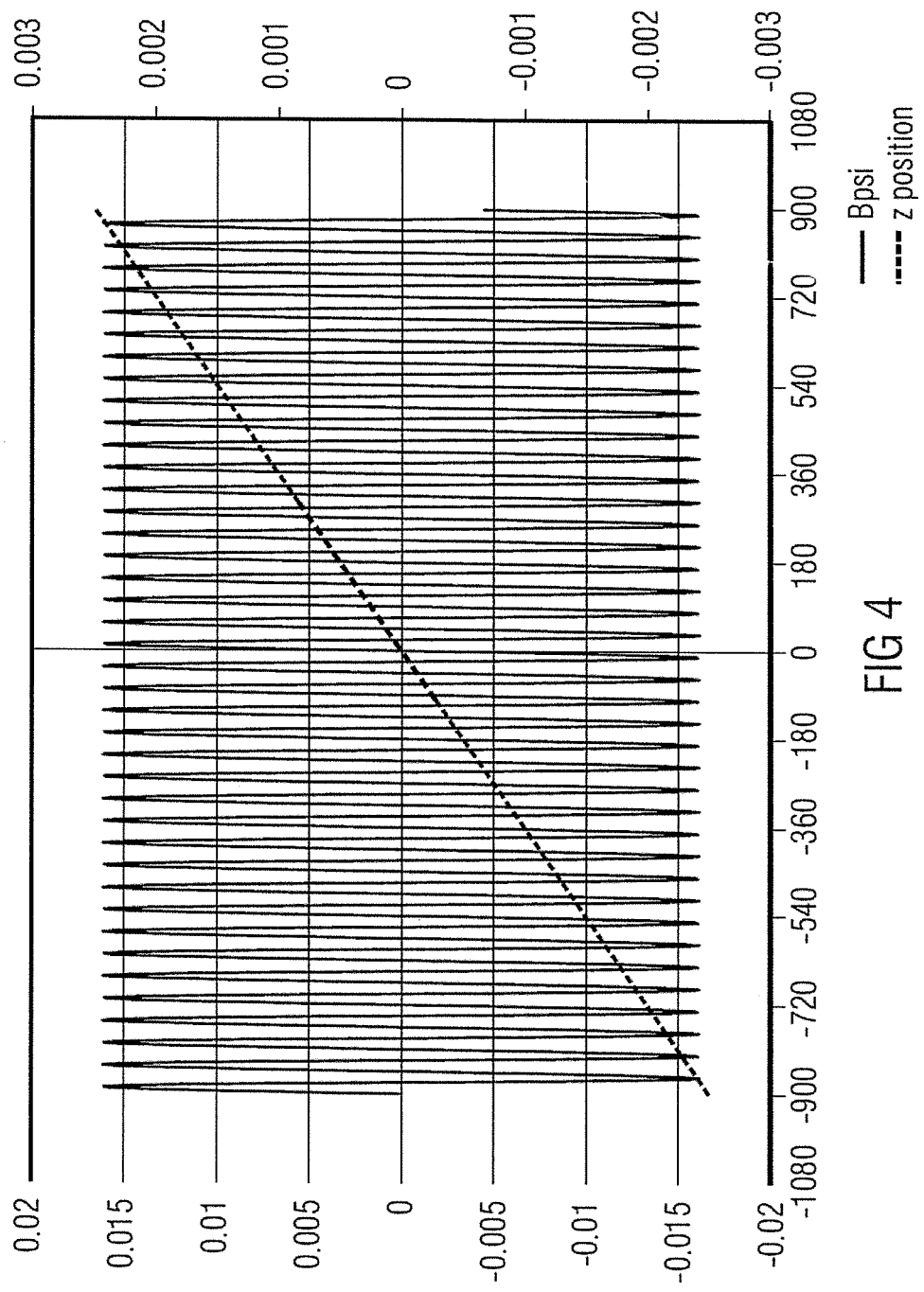
FIG. 4 shows a function graph of a first variable of the magnetic field and of a translational position as a function of the absolute rotation angle for a possible rotation angle sensor.

FIG. 4 shows as an example (for a specific arrangement) a profile of the tangential magnetic field or of the tangential magnetic flux density $B_\psi$ in an angular range of −900° to +900°. The magnetic flux density is expressed in tesla and is evident from the left-hand scale in FIG. 4. Accordingly, the magnetic flux density in a tangential direction attains a peak value of $\hat{B}_\psi$=0.016 T. For the purposes of the illustration it was assumed that the encoder arrangement has p=4 pole pairs, such that four sine periods occur over a full revolution. The relative z-position between the encoder arrangement and the magnetic field sensor is illustrated in FIG. 4 as a dashed line for which the right-hand scale with the unit meter is valid. Within a revolution, the z-position changes by 0.001 m=1 mm. It goes without saying that other values for the parameters p and $\Delta_z$ are also conceivable. FIG. 4 shows clearly that, at least for relatively small translational displacements between the encoder arrangement and the magnetic field sensor (typically up to an axial extent of the encoder arrangement), the tangential magnetic field component Bpsi is not dependent on the z-position. What can at least be achieved in real arrangements is that the tangential magnetic field component is dependent on the z-position only to a very small extent.

Figure 5:
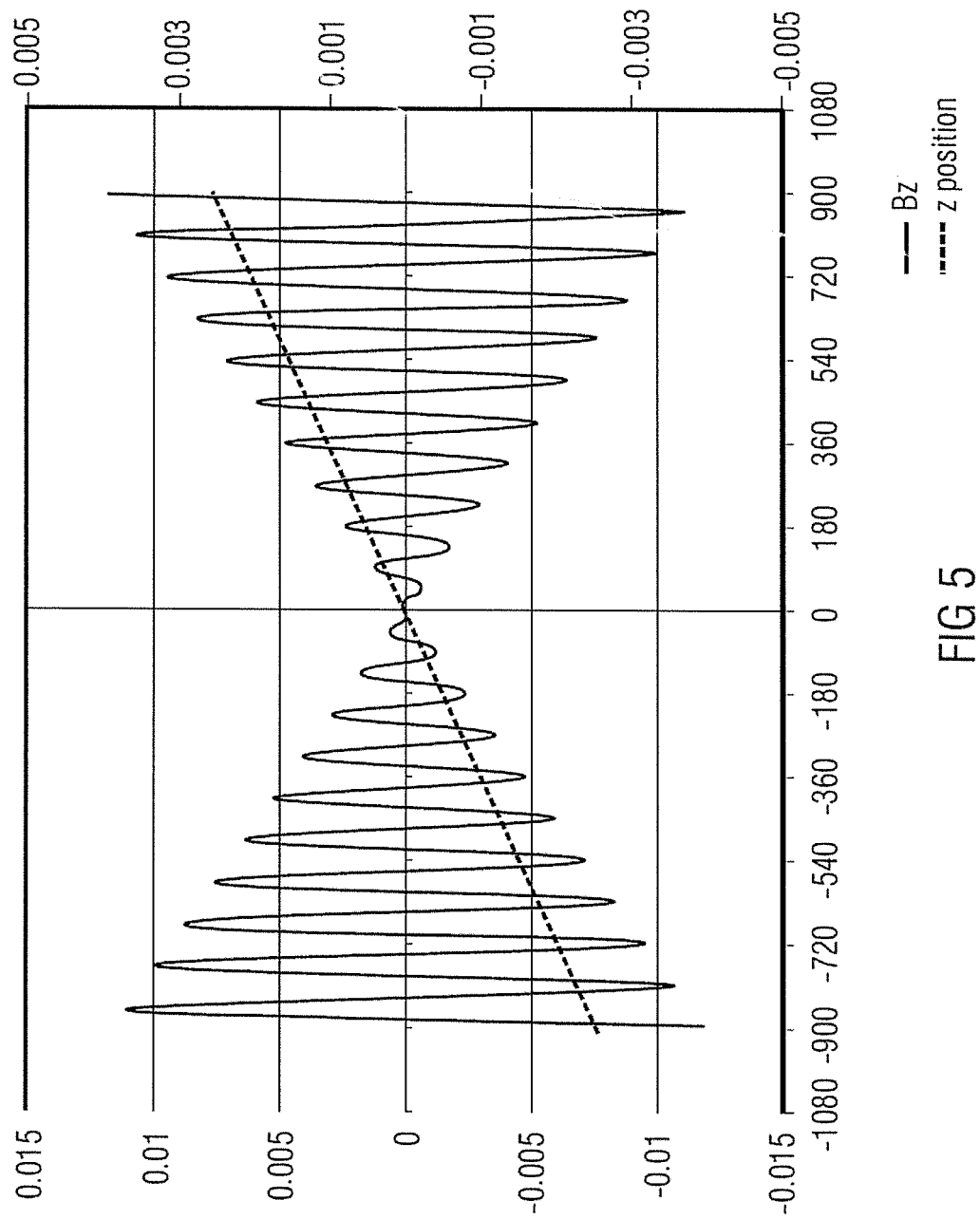

FIG. 5 shows an illustration similar to FIG. 4, but for the axial magnetic field component Bz. It can be discerned that, proceeding from the central position for ψ=0 and z=0, the extreme values increase substantially linearly with increasing distance within the center. At the edges of the angular range at −900° and +900°, where Bz is the highest, Bz attains a value of 0.018 T, that is to say somewhat more than the amplitude of the tangential and radial direction components Bpsi and Br, respectively. The relatively great dependence of the Bz direction component on the z-position can expediently be used for the purposes of absolute rotation angle determination.

The rotation angle sensor allows the measured value for the tangential direction component of the magnetic field or of the magnetic flux density $B_\psi$ to be compared with the (known) maximum amplitude value $\hat{B}_\psi$ in order to derive therefrom the relative rotation angle ψ up to an (integral) multiple of 360°/p. It is likewise possible to compare the measured value for the radial direction component $B_r$ with the (known) maximum amplitude value $\hat{B}_r$. Furthermore, $B_\psi$ can be compared with $B_r$, e.g. by means of the known CORDIC algorithm. $\hat{B}_z$ can subsequently be compared with $\hat{B}_\psi = \hat{B}_r$. In this way, the remanence $B_{rem}$ cancels out: therefore, the system is robust against a variation or drift of the strength of the magnets. Although the terms in the equations for the three direction components of the magnetic field $B_\psi$, $B_r$ and $B_z$, which contain the air gap g and the axial width of the pole wheel or the encoder arrangement w are not perfectly identical, they are nevertheless similar enough that the measuring system can determine the z-coordinate with acceptable accuracy.

Figure 6:
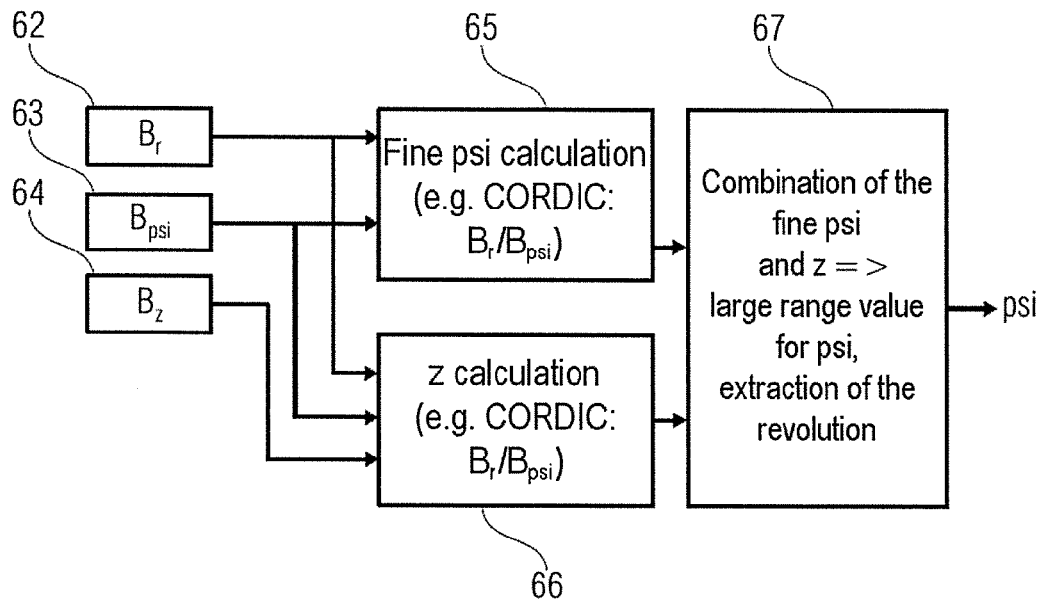
FIG. 6 shows a schematic block diagram for illustrating a possible calculation method in accordance with example embodiments.

In the schematic block diagram in FIG. 6, the three direction components $B_r$, $B_{psi}$ and $B_z$ are provided by the magnetic field sensor 30 for the further calculation, this being illustrated by the blocks 62, 63 and 64, respectively, in the context of FIG. 6. Although it is typically advantageous for the evaluation, it is not absolutely necessary that both the radial direction component $B_r$ and the tangential direction component $B_{psi}$ are detected by the magnetic field sensor 30 and provided for the further calculation. The radial direction component $B_r$ and the tangential direction component $B_{psi}$ are fed to a calculation block 65 used for a calculation of the relative angular position between the encoder arrangement and the magnetic field sensor within a small range, namely typically within a magnetic period. The CORDIC algorithm can be used for this purpose. In this case, the abbreviation CORDIC stands for "COordinate Rotation Digital Computer". The values for the radial and tangential direction components $B_r$ and $B_{psi}$ are also communicated to a further calculation block 66, which is used for the calculation of the relative translational position between encoder arrangement and magnetic field sensor, here the z-position of the encoder arrangement, the z-position being dependent on the absolute rotation angle. In addition to $B_r$ and $B_{psi}$, the axial direction component of the magnetic field or of the magnetic flux density $B_z$ is also used as an input variable for the calculation block 66. A CORDIC algorithm can be used here as well. The results of the calculation blocks 65 and 66 are used as input variables for a further calculation block 67, which combines the fine relative rotation angle value psi and the value determined in the calculation block 66 for the z-position of the encoder arrangement in order to determine therefrom a large range value for the rotation angle psi, i.e. the absolute rotation angle. Furthermore, an extraction of the revolution can also be effected in the context of the calculation block 67. The combination of the fine psi value and the z-position can have recourse in particular to a known mechanical linkage between these two variables which is predefined e.g. by a gear mechanism (spindle gear mechanism, crank gear mechanism, toothed rack gear mechanism, etc.) in the form of the parameter $\Delta_z$.

Figure 7:
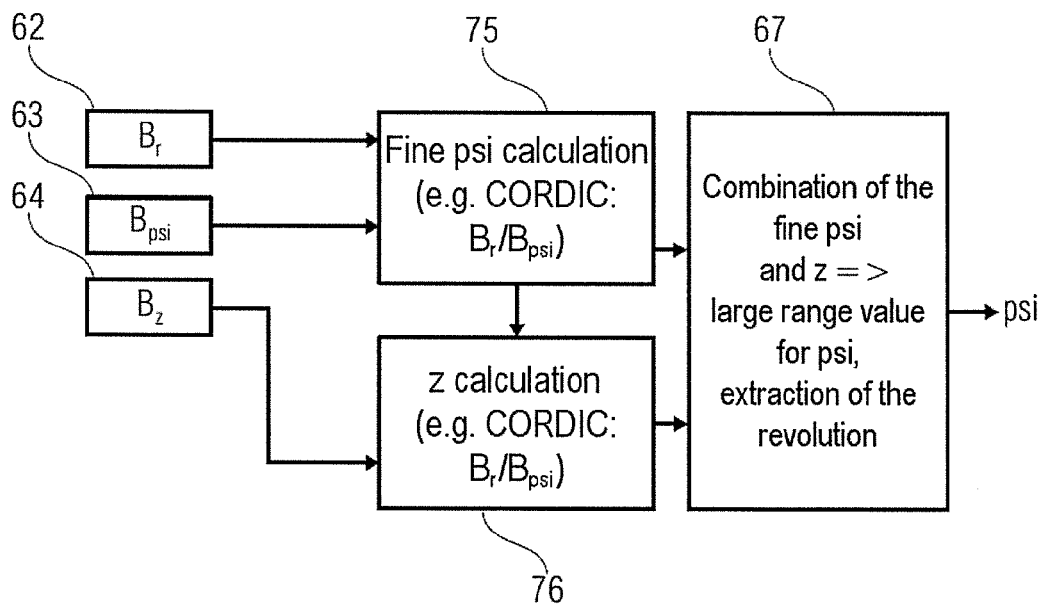
FIG. 7 shows a schematic block diagram for illustrating a calculation method in accordance with alternative example embodiments.

The schematic block diagram illustrated in FIG. 7 is similar to the block diagram from FIG. 6. One difference is that the radial and tangential direction components $B_r$ and $B_{psi}$ are not fed to the calculation block for the calculation of the z-position of the encoder arrangement relative to the magnetic field sensor. Instead, a modified calculation block 75 for the fine psi calculation passes the determined value for the relative angular position, that is to say the fine psi value, to a modified calculation block for the z-position 76. A CORDIC algorithm can once again be used in the context both of the calculation block 75 and of the calculation block 76. As in the block diagram from FIG. 6, the results of the calculation blocks 75, 76 are forwarded to the further calculation block 67, which determines the large range value for psi, that is to say e.g. the absolute rotation angle, from these input variables.

Figure 8:
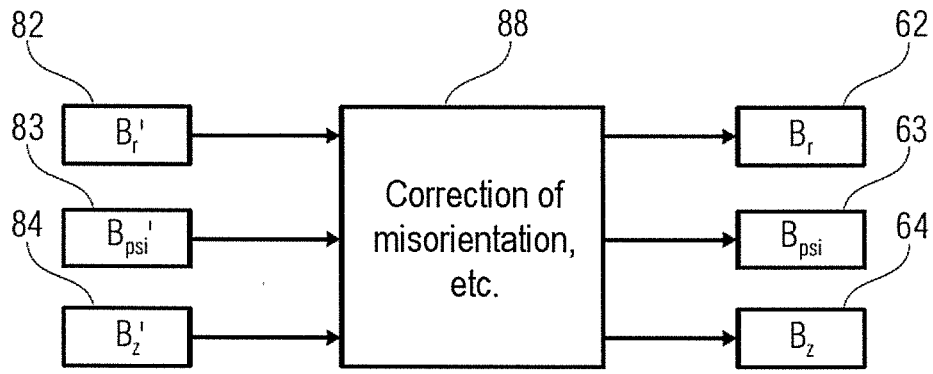
FIG. 8 shows a schematic block diagram for illustrating an optional correction of misorientations.

FIG. 8 shows a schematic block diagram for correcting possible misorientations between the individual components of the rotation angle sensor or else for compensating for possible manufacturing tolerances, e.g. with regard to the width g of the air gap between the encoder arrangement and the magnetic field sensor. In this way, the sensor system can be improved if it takes account of misorientations and/or manufacturing tolerances of the sensor module. If the sensor is arranged, for example obliquely in space relative to the axis of rotation, it can be advantageous to carry out a coordinate rotation before the signal processing shown in FIGS. 6 and 7. In the case of an oblique or inclined orientation of the magnetic field sensor relative to the axis of rotation, the three sensor elements of the magnetic field sensor do not detect the actual radial, tangential and axial direction components of the magnetic field or of the magnetic flux density, but rather direction components which are rotated relative to the actual direction components and are designated here by Br', Bpsi' and Bz'. FIG. 8 illustrates these direction components actually detected by the magnetic field sensor 30 in corresponding blocks 82, 83, 84 of the schematic block diagram. A signal processing block 88 corrects these misorientations by multiplying the vector (Br', Bpsi', Bz') by a matrix. If the determinant of the matrix is equal to 1, a genuine rotation in space is carried out. However, it can also be advantageous to scale some field components, and then the determinant is not equal to 1. The output of the matrix multiplication is a corrected field vector {Br, Bpsi, Bz}, which can be used like the input vector in FIGS. 6 and 7. For this purpose, the corrected values Br, Bpsi and Bz are again provided in the blocks 62, 63, 64, where they can be retrieved by the calculations 65, 66 and 75, 76 in FIGS. 6 and 7, respectively.

If e.g. five revolutions are intended to be detected by means of the rotation angle sensor in accordance with example embodiments, it is advantageous to choose the axial height of the encoder arrangement to be three to seven times the magnitude of the translational displacement per revolution, i.e. $w=3\Delta_z \ldots 7\Delta_z$. The total stroke of the axial movement is then approximately equal to the width of the code wheel or the encoder arrangement and the Bz field thus varies virtually linearly with the z-position and consequently with the number of revolutions. By contrast, if only one revolution is intended to be detected, i.e. an absolute angular range of 360°, the proposed system can still be used expediently and the axial height of the encoder arrangement $w=\Delta_z \ldots 1,4\Delta_z$ is chosen in this case.

The number p of pole pairs of the code wheel or of the encoder arrangement should be chosen such that an axial movement of $\Delta_z/p$ is large enough to be detected with sufficient reliability by the sensor system. In this case, the angular resolution of $360°/p$ is achieved by comparing the Bz component with the other components (Br, Bpsi), while a finer resolution can be achieved by sinusoidal interpolation of the other components (Br, Bpsi).

Some systems rely on estimating the amplitude of the field patterns. One relatively simple possibility for doing this includes observing the field pattern during a certain time in which the wheel or the encoder arrangement rotates relative to the magnetic field sensor (or the magnetic sensor rotates relative to the encoder arrangement), to be precise at least over an angle of $psi=360°/p$. This is a feasible option for systems which operate at a constantly high speed.

For systems in which the shaft may be stationary for a relatively long time and the system must nevertheless know or determine the angular position of the shaft (e.g. steering angle sensor), it is necessary to use a sensor system which can derive or determine the amplitudes directly without any movement of the wheel or shaft (i.e. genuine power-on functionality).

One possibility for achieving this includes arranging two sensor elements of the same type (i.e. for the same direction component of the magnetic field) in a manner spaced apart from one another, e.g. with a spacing of $\lambda/4$ (i.e. one quarter of the magnetic period). The two sensor elements can be provided either on two separate semiconductor chips or on a single semiconductor chip. The two sensor signals supplied by the sensor elements that are spaced apart from one another are phase-shifted by 90°, to be precise in the direction in which the magnetic period extends. If one of the two signals is represented by definition as a sine wave, the other signal is a cosine wave. The amplitude can then be determined by Pythagorean addition, i.e. by squaring each sensor signal, summing the squares and determining the square root of the summation result.

Other systems do not have to extract the amplitude. Instead, instantaneous values of the tangential direction component $B_\psi$ and the radial direction component $B_r$ are compared. In one embodiment, the tangential and radial direction components $B_\psi$ and $B_r$ are measured substantially at the same location on a semiconductor chip having the magnetic field sensor for determining the direction components of the magnetic field, provided that it is possible to arrange the two basic sensor elements as close to one another as possible on the semiconductor chip. The two components Bψ and Br behave like sine and cosine and can be fed to a CORDIC algorithm in order to calculate the angular position psi (with an unknown integral multiple of 360°/p).

In order to make the system more robust toward external magnetic disturbance, a differential measurement principle can be used. For this purpose, two sensor elements are present for each direction component which is intended to be detected (typically two direction components or three direction components). The two sensor elements are situated with a specific spacing s, (s for English: "spacing"), which is oriented for example in the direction of the relative movement between the magnetized segments and the sensor. Since the axial movement $\Delta_z$ per revolution is small compared with the movement in the tangential direction along the circumference of the wheel or of the encoder arrangement, the spacing s typically likewise extends tangentially with respect to the wheel circumference. If a magnetic field component then has a pattern in accordance with $\sin(2\pi r\psi/\lambda)$, the first sensor element detects $\sin(2\pi(r\psi-s/2)/\lambda)$ and the second sensor element detects $\sin(2\pi(r\psi+s/2)/\lambda)$. Subtraction of these signals detected by the two sensor elements yields $2\sin(\pi s/\lambda)\cos(2\pi r\psi/\lambda)$. This means that the largest differential signal is obtained for $2s=\lambda$. However, the term $\sin(\pi s/\lambda)$ even for a somewhat smaller spacing s (e.g. (3 . . . 4)s=λ) is not too small, i.e. sufficiently large. For $4s=\lambda$, this results in e.g. $\sin(\pi s/\lambda)=0.71$, which means that 29% of the maximum available signal which would be achievable for $2s=\lambda$ has been lost. However, a smaller spacing s between the sensor elements in this case helps to save chip size since, in practice, a large λ, but also a small spacing s (which means a small required size of the semiconductor chip) are often desired. The differential measurement principle makes it possible for a homogeneous magnetic background field to cancel out or to be cancelled out computationally in the calculations, which makes the angle determination robust toward magnetic disturbances.

Figure 9:
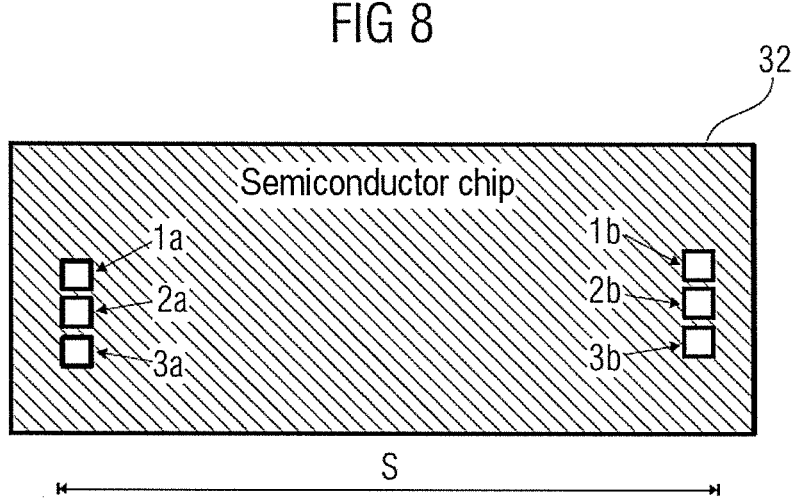
FIG. 9 shows a schematic plan view of a semiconductor chip that can be used within a magnetic field sensor of a rotation angle sensor in accordance with example embodiments.

FIG. 9 shows a layout of the semiconductor chip 32 of the magnetic field sensor 30 as a schematic plan view, not to scale. Two groups of sensor elements are arranged in the semiconductor chip 32 or on the surface thereof. The left group comprises three sensor elements, of which the sensor element 1a is a first sensor type for detecting Br components, the sensor element 2a is a second sensor type for detecting Bpsi components and the sensor element 3a is a third sensor type for detecting Bz components. Situated with a spacing s is the right group of once again three sensor elements, of which the sensor element 1b is a first sensor type for detecting Br components, the sensor element 2b is a second sensor type for detecting Bpsi components and the sensor element 3b is a third sensor type for detecting Bz components. The spacing of the three sensor types should be as small as possible in the vertical direction (relative to the illustration in FIG. 9).

Figure 10:
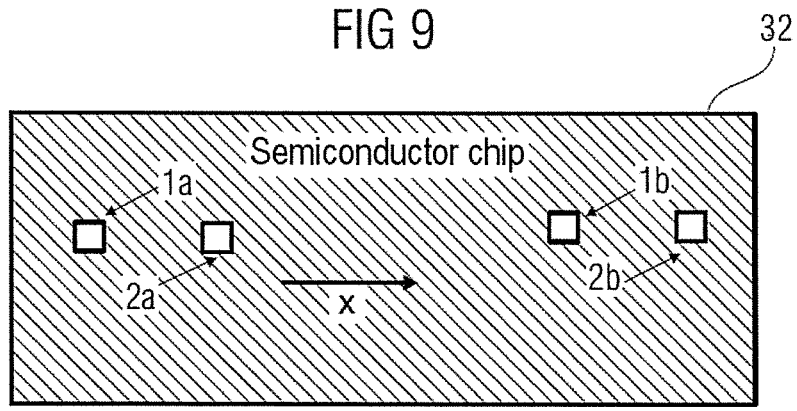
FIG. 10 shows a schematic plan view of a further possible semiconductor chip that can be used within a magnetic field sensor of a rotation angle sensor in accordance with example embodiments.

The different sensor type elements can also be displaced in the horizontal direction (x-direction or psi direction), as illustrated schematically in FIG. 10. In this case, the left group of sensor elements comprises two sensor elements 1a and 2a, which are suitable for example for detecting the Br component and the Bz component, respectively. The right group of sensor elements likewise comprises two sensor elements 1b and 2b, which react to the same magnetic field components, that is to say e.g. Br and Bz, respectively. In this case, the spacing between the sensor elements 1a and 1b is typically chosen to be approximately equal in magnitude to the spacing of the sensor elements 2a and 2b. However, it is also possible for the different types of sensor elements to be arranged in a nested manner in the semiconductor chip 32 or on the surface thereof, such that e.g. the sensor elements 2a and 2b have a smaller spacing from one another than the sensor elements 1a and 1b. The different spacings can subsequently be taken into account in the evaluation of the magnetic field values determined. In the case of a nested arrangement, both sensor element pairs have the same center of gravity, but the factor $\sin(\Pi*s/\lambda)$ is different, wherein the latter can be calibrated (and thus corrected). In the case of a mutually offset arrangement, for example by λ/4, during measurement of Bpsi and Br, the amplitude can be formed by the sum of the squares of absolute values upon power-on.

In accordance with example embodiments, a code wheel can be positioned on a rotatable shaft and a sensor can be positioned in proximity thereto, the rotation being linked with a relative translational movement between sensor and shaft or code wheel. The sensor has magnetic sensor elements (sensor elements which react to a magnetic field) which detect at least two (or three) independent magnetic field components Br, Bz or Bpsi, Bz or Br, Bpsi, Bz. An algorithm uses at least two components (Br, Bz or Bpsi, Bz), to derive or determine the relative translational position therefrom, and at least one component (Br, Bpsi, or both) to determine a rotational position or relative angular position between code wheel and sensor. The combination of translational position and rotational position provides a unique rotational position in a larger (angular) range than could be achieved only with the magnetic field components Br, Bpsi alone.

In some example embodiments, differential sensors are used, wherein one sensor type detects a first magnetic field component and a second sensor type detects a second magnetic field component. In this case, two sensor elements of each type are positioned with a spacing of at least 0.5 mm (if appropriate also at least 1 mm or at least 2 mm or at least 3 mm) from one another.

Figure 11:
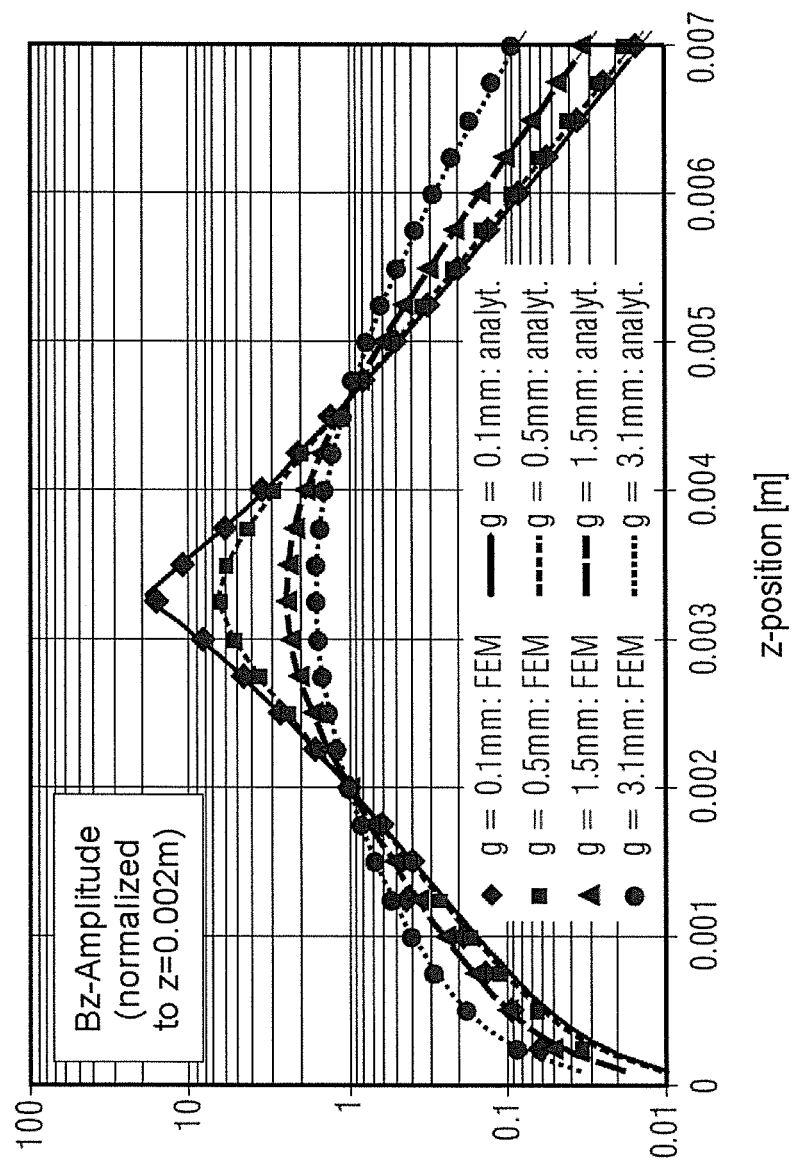
FIG. 11 shows a profile of the z-component of the magnetic field as a function of the relative translational position between encoder arrangement and magnetic field sensor for various parameters as analytical solution and numerically calculated solution.

FIG. 11 shows a graph illustrating the amplitude $\hat{B}_z$ as a function of the z-position. The underlying arrangement is illustrated schematically in FIG. 2, for example. FIG. 11 thus shows the dependence of the $B_z$ field of a multipolar strip or of a multipole wheel on the translational position (here the z-position of the encoder arrangement). The analytical solution indicated further above in the form of equations is indicated in FIG. 11 in the form of solid lines for different parameter values for the air gap width g. In addition, FIG. 11 also shows numerical solutions for the same parameter values, which were determined with the aid of a finite elements simulation (FEM). A comparison of the analytical solutions with the finite elements simulations shows a good correspondence for all air gap widths g taken into account and all z-positions, even beyond the edge of the encoder ring or of the encoder arrangement 220. The following boundary conditions were assumed: remanence=500 mT, coercivity Hcb=355 kA/m, λ=4 mm, w=6.6 mm, t=2.4 mm, with steel back. As can be seen in FIG. 11, the maximum $B_z$ field is obtained at the edge of the strip or of the code wheel, i.e. at a z-position of z=w/2.

The dimensioning of a rotation angle sensor is discussed below. A spacing s=3 mm between sensor elements which respond to the same magnetic field component is chosen since this is approximately the largest spacing which can be accommodated on a semiconductor chip of customary size (approximately 6 mm$^2$). The chip has e.g. a size of 3.3 mm×1.8 mm. Sensor elements for Bpsi, Br and Bz are positioned at a side which is to be designated as the left side for orientation purposes. With a spacing of 3 mm, additional sensor elements for Bpsi, Br and Bz are positioned further on the right or in proximity to a right-hand side of the semiconductor chip. The system evaluates the difference between corresponding left and right sensor elements, which results in the three differential field components dBpsi=Bpsi (left)−Bpsi(right), dBr=Br(left)−Br(right) and dBz=Bz (left)−Bz(right).

If the spacing s is chosen such that 4s=λ, a good compromise between chip size and strength of the differential signal appears to be achieved. Consequently, λ=12 mm results as the value for the magnetic period.

It is now assumed that a space having a diameter of 30 mm is available for the magnetic code ring or the encoder arrangement. This yields a circumference of 94 mm which can take up p=8 pole pairs with λ=11.78 mm. The above-mentioned value sin(πs/λ) is in this case sin(πs/λ)=0.72.

Figure 12:
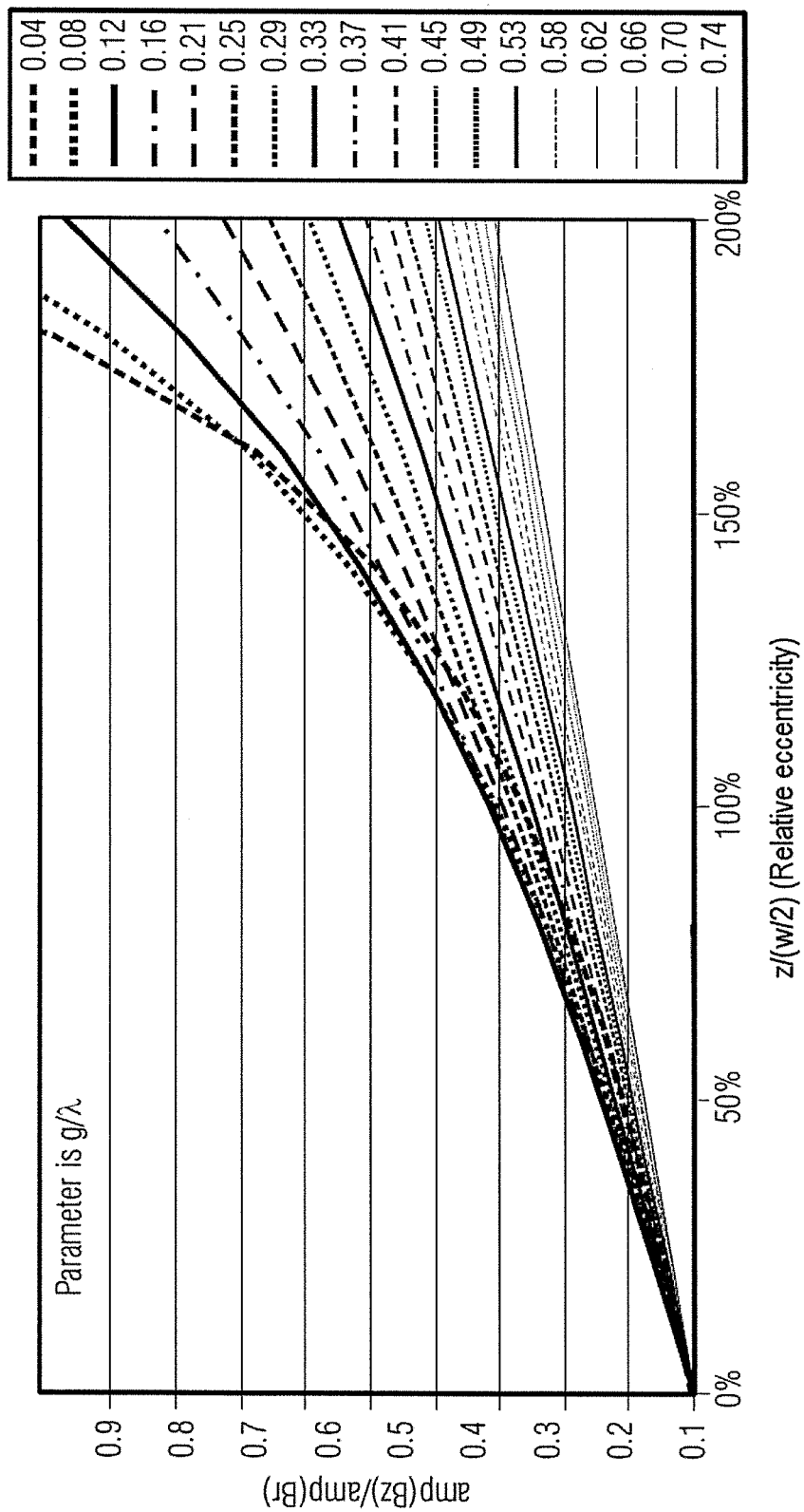
FIG. 12 shows a function graph in which an amplitude ratio of two variables of the magnetic field is plotted as a function of the relative translational position between encoder arrangement and magnetic field sensor, to be precise for different values of a parameter g/λ (air gap width/magnetic period)

If the height of the encoder arrangement w=5 mm is then chosen, the ratio of Bz/Br is a good measure of the z-coordinate. This relationship is illustrated graphically in FIG. 12 for different parameter values of the parameter g/λ, i.e. the ratio of air gap width g to magnetic period λ. The abscissa of the function graph in FIG. 12 shows the relative eccentricity, i.e. the z-position of the encoder arrangement relative to a zero position or reference position in relation to half the height w/2 of the encoder arrangement. The ordinate shows the ratio of the amplitudes of the z-component to the r-component of the magnetic field. FIG. 12 shows that, for the zero position of the encoder arrangement at z=0 in the central plane or the plane of symmetry of the ring, the ratio Bz/Br is substantially 0. The function graph in FIG. 12 shows only the positive z-values, but in the case of negative z-values the functions are odd, i.e. f(−x)=−f(x). It can be seen that, for specific air gap widths g, the curves are virtually linear for |z|<w/2 . . . w, i.e. in a relatively wide range. One condition is that the air gap must not be too small, since the curves exhibit a high degree of curvature for a small air gap (which makes the evaluation more difficult, but is nevertheless possible). Here g/λ=0.33 shall be indicated as an example of a good choice of the ratio of air gap width g to magnetic period λ.

Figure 13:
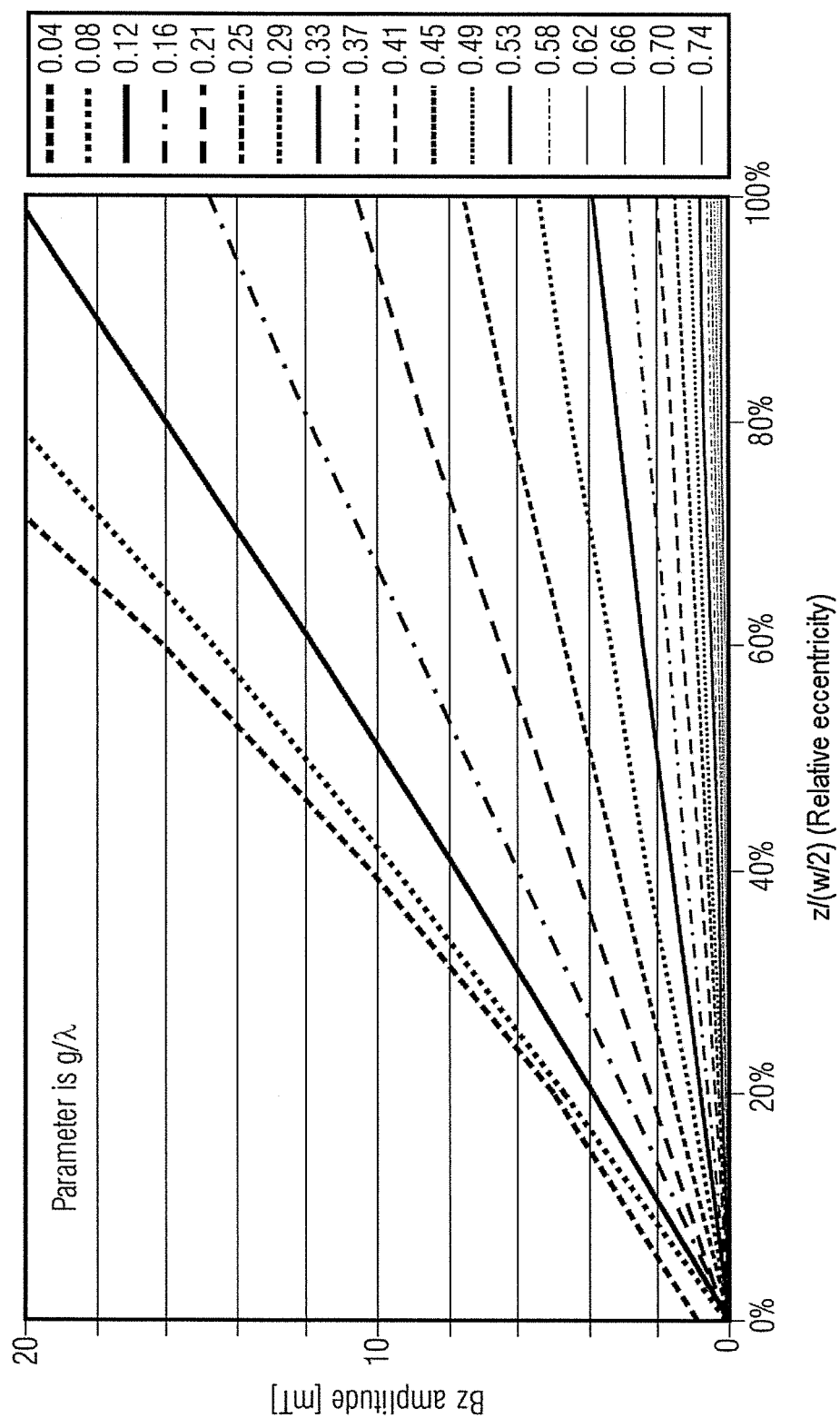
FIG. 13 shows a function graph in which the amplitude of the z-direction component of the magnetic field is plotted against the relative translational position, to be precise once again for different values of the parameter g/λ.

FIG. 13 shows the Bz field in absolute units, namely mT. The remanence Brem of the permanent-magnetic code ring is assumed at 500 mT and its relative permeability is μr=1.17. A comparison of FIG. 12 and FIG. 13 shows that the Bz field is more linear than the ratio Bz/Br or Bz/Bpsi. Therefore, an algorithm could use the Br component and/or the Bpsi component separately to determine the air gap, and then to deduce the z-coordinate from Bz.

In some example embodiments, a rotation angle sensor can comprise a gear mechanism or a mechanism which produces the relative translational position on the basis of the absolute rotation angle. This type of rotation angle detection is particularly useful in applications in which precision mechanisms are moved with regard to the position by means of e.g. a hand wheel or a stepper motor, since the source of the movement is then a rotation and the latter is transformed into a to and fro movement.

Figure 14:
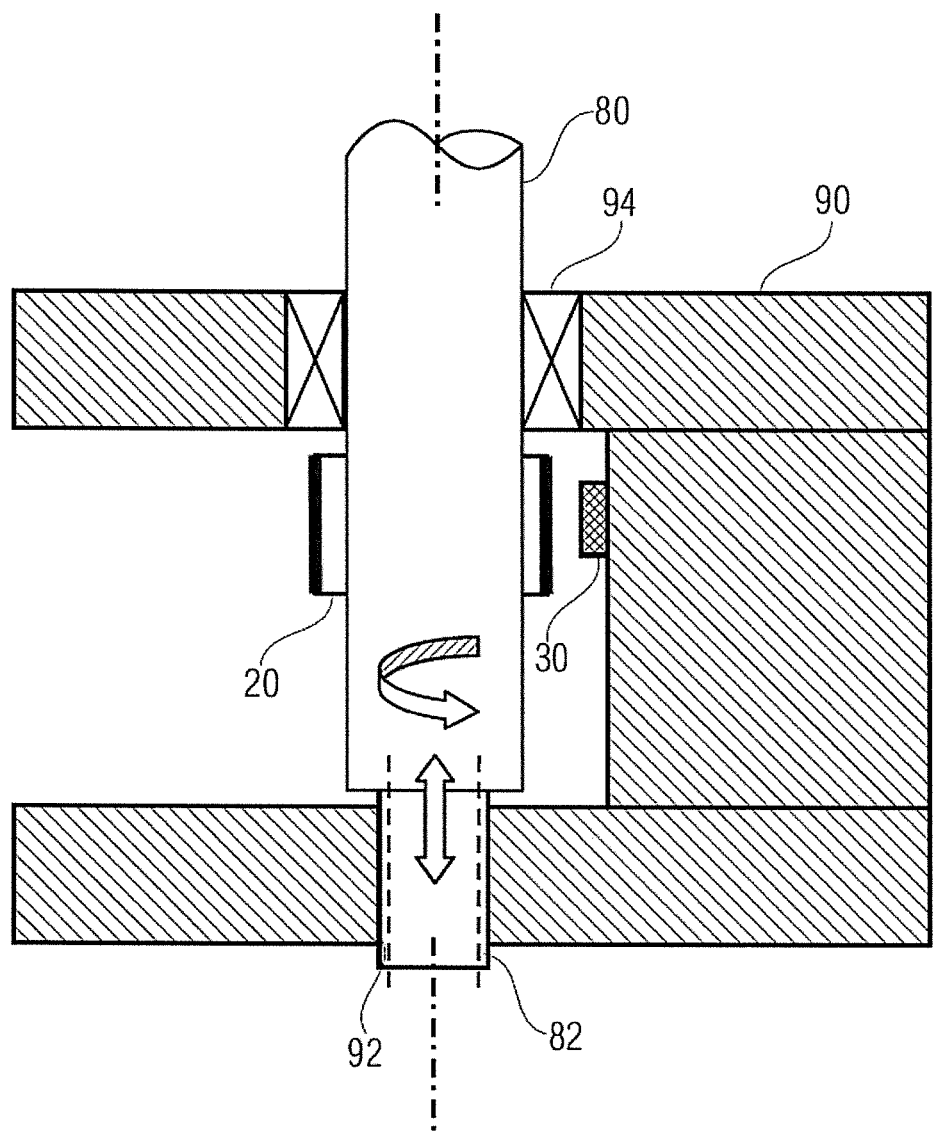
FIG. 14 shows a schematic cross-sectional view of an arrangement which uses a rotation angle sensor in accordance with example embodiments in order to measure the absolute rotation angle of a shaft.

FIG. 14 depicts a possible gear mechanism and a rotation angle sensor in accordance with example embodiments in a schematic sectional illustration. The task of the rotation angle sensor is to detect the absolute rotation angle of a shaft 80, which could be e.g. a steering column. In this case, the absolute rotation angle to be detected can change, if appropriate, within a rotation angle range encompassing more than one full revolution, i.e. more than 360°. At its end illustrated in FIG. 14, the shaft 80 is mounted by means of a bearing block 90, a bearing 94 and a thread arrangement. The thread arrangement includes an external thread 82 of the shaft 80 and a corresponding internal thread 92 embodied in the bearing block 90. Alternatively, it is also possible to provide a threaded bush which is connected to the bearing block 90 in a rotationally fixed manner and has an internal thread for interaction with the external thread 82 of the shaft 80. The bearing 94 could be a sintered bearing since such a bearing permits both a rotational movement and an axial movement and is furthermore cost-effective. On account of the interaction of the external thread 82 with the internal thread 92, the shaft 80 moves up and down when it rotates. In the case of a steering column, such an up and down movement of the shaft 80 is virtually imperceptible to the operator if it is carried out only to a small extent. For example, the thread formed by the external and internal thread 82, 92 can have a thread height of 1 mm or 2 mm, such that the shaft 80 is displaced axially by 5 mm during five possible revolutions of said shaft. A small play of the thread turn is usually present between the external thread 82 and the internal thread 92. This play can be minimized e.g. by spring loading. Furthermore, the distance between the end of the thread and the sintered bearing 94 can be chosen to be relatively large. The radial play of the sintered bearing 94 is small (compared with the play of the end of the thread). Therefore, the measuring wheel of the encoder arrangement 20 should be arranged nearer to the sintered bearing 94 or sintered bearings than to the end of the thread.

If a displacement of the shaft 80 in the axial direction is undesirable, the encoder arrangement can comprise a sleeve, which is fixedly connected to the shaft 80 for example by positively locking connection, force-locking connection or friction-locking connection. The actual code wheel or multipole wheel can then be, for example, rotationally fixed by means of a toothing or a tongue/groove arrangement, but axially displaceable relative to the sleeve and thus relative to the shaft 80. The code wheel can then have an internal or external thread that interacts with a corresponding counter-thread fixedly connected to the bearing block 90.

Alongside a translational relative movement between encoder arrangement 20 and magnetic field sensor 30 in an axial direction, a relative movement in a radial direction can alternatively or additionally be implemented. For this purpose, the encoder arrangement 20 can be arranged in a manner radially displaceable with respect to the shaft 80. The radial relative movement can be effected e.g. by means of a guide pin which is fixedly connected to the encoder arrangement 20 and which engages into a spiral groove positionally fixed relative to the bearing block 90. In this way, it is possible to vary the air gap width in a radial direction depending on the absolute rotational angle, which has an effect on the magnetic field detected by the magnetic field sensor 30. Another possibility for a relative radial movement between encoder arrangement 20 and magnetic field sensor 30 is provided by a gearwheel/toothed rack mechanism. The encoder arrangement can comprise a gearwheel which is rotationally fixed with respect to the shaft 80. Consequently, the angular position of the gearwheel corresponds to the absolute rotation angle. The gearwheel can interact with a toothed rack which runs parallel to a radial direction with respect to the axis of rotation of the shaft 80 and is displaceable along this direction. In this way, the absolute rotation angle is converted into a linear position of the toothed rack. The magnetic field sensor 30 can be connected indirectly or directly to the toothed rack, such that the magnetic field sensor 30 participates in the longitudinal movement performed by the toothed rack. In this way, it is possible to vary a radial spacing between the magnetic field sensor 30 and the axis of rotation of the shaft 80 depending on the absolute rotation angle of the shaft 80. The above-mentioned gearwheel can be arranged, in particular, in a manner offset with respect to the code wheel in an axial direction, such that the toothed rack is also arranged at a corresponding axial position. The magnetic field sensor 30 can be fixed to a mount which extends in an axial direction and, for its part, is connected to the toothed rack, such that the magnetic field sensor 30 is arranged at the same axial position as the encoder arrangement 20.

Figure 15:
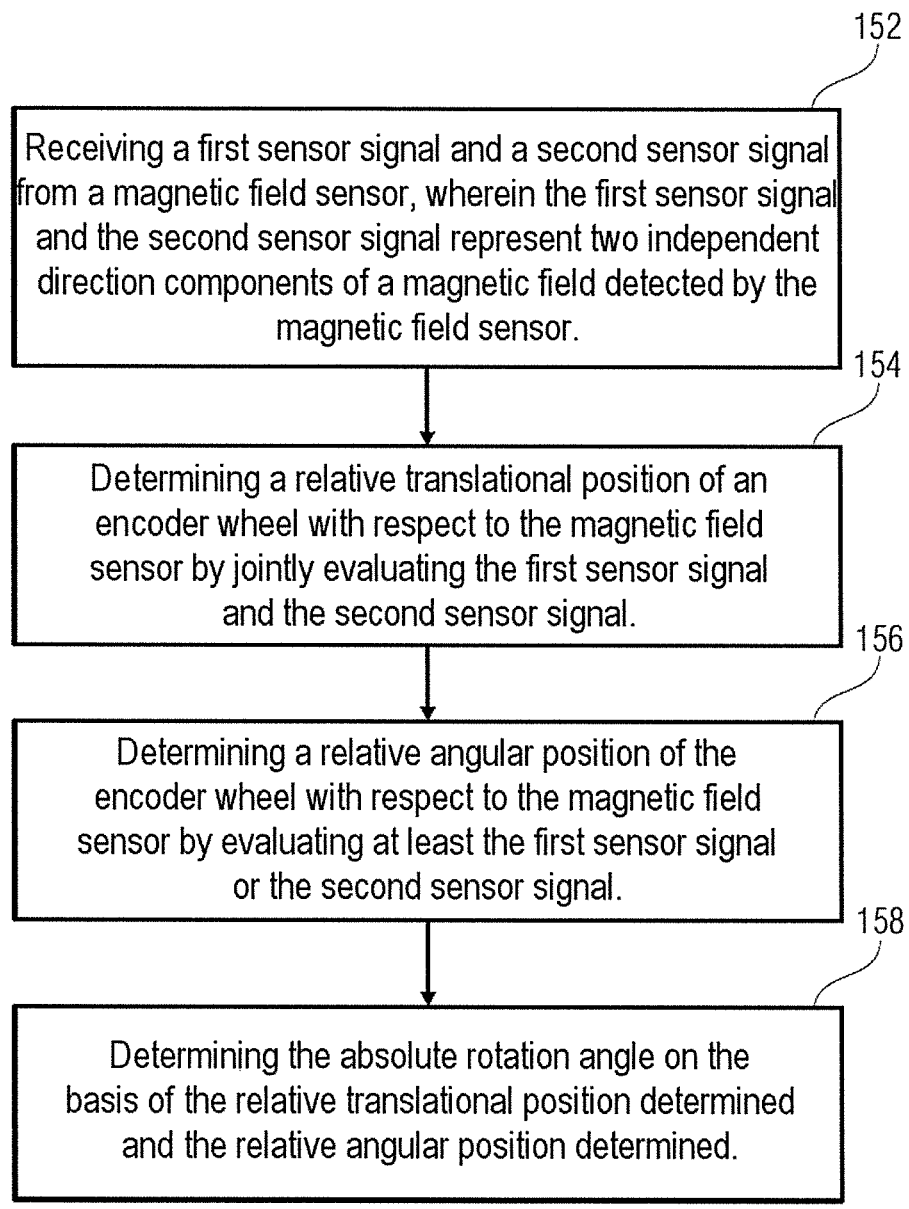
FIG. 15 shows a schematic flowchart of a method for determining an absolute rotation angle in accordance with example embodiments.

FIG. 15 shows a schematic flowchart of a method for determining an absolute rotation angle in accordance with example embodiments. A first step 152 involves receiving a first sensor signal and a second sensor signal from a magnetic field sensor, wherein the first sensor signal and the second sensor signal represent two independent direction components of a magnetic field detected by the magnetic field sensor. However, it is also possible for additionally a third sensor signal or even still further sensor signals to be detected which originate from the magnetic field sensor or one or more magnetic field sensors. There is usually an assignment between the first sensor signal and one of the two independent direction components, and between the second sensor signal and the other independent direction component of the magnetic field. However, this is not necessarily the case, and so the two independent direction components can, if appropriate, also be determined by vector component splitting of the two sensor signals.

An act 154 of the method for determining the absolute rotation angle involves determining a relative translational position of an encoder arrangement (e.g. of an encoder wheel) with respect to the magnetic field sensor by jointly evaluating the first sensor signal and the second sensor signal. By means of jointly evaluating the first sensor signal and the second sensor signal, an ambiguity possibly present within one of the two sensor signals can be resolved, such that the relative translational position can be restricted at least to a sufficiently small range. Specifically, this makes use of the fact that the first sensor signal and the second sensor signal behave differently with regard to a change in the relative translational position.

A relative angular position of the encoder arrangement with respect to the magnetic field sensor can be determined by evaluating at least the first sensor signal or the second sensor signal, as shown at 156 of the flowchart illustrated in FIG. 15. However, acts 154 and 156 can also be performed in the opposite order or else simultaneously with one another. Furthermore, it is possible for the determination of the relative translational position to have recourse to a result which is produced by the determination of the relative angular position (that is to say act 156) and is indicated schematically in the block diagram in FIG. 7.

The absolute rotation angle can then be determined on the basis of the relative translational position determined and the relative angular position determined, as indicated at act 158. For this purpose, it is possible to have recourse to a known relationship between the relative translational position and the relative angular position, which results e.g. from the pitch of a thread which is used for producing the relative translational position from the absolute rotation angle. Very generally, for this purpose it is possible to use a transmission ratio which indicates how the relative translational position behaves with respect to the absolute rotation angle and/or the relative angular position. Such a transmission ratio is generally predefined by the used gear mechanism which is used for producing the relative translational position on the basis of the absolute rotation angle.

In the case of many absolute rotation angle sensors currently known it is not possible to use a multipole wheel since the angular range that can be detected is limited by the periodic subdivision of the multipole wheel. On the other hand, with a large magnetic period (as is the case with a small number of pole pairs), the inaccuracy of the magnetic field detection also increases. Consequently, in the case of known rotation angle sensors of this type, the requirements for a large detectable angular range and high precision conflict as competing requirements.

A combination with through shafts is possible in a relatively simple manner since it is not absolutely necessary for a magnet used for magnetic field generation to lie on the axis of the shaft.

In contrast to some known rotation angle sensors, the proposed rotation angle sensor does not require, for example, a magnet to be guided by means of a linear guide (which produces a constraint for the movement), such that the rotational movement of the shaft is mapped linearly onto an axial movement. Such a linear guide is mechanically complex, is moreover less accurate owing to the bearing play and causes abrasion. Furthermore, in some of these rotation angle sensors, a sensor for detecting the linear movement has to be approximately as large as the axial stroke. In contrast thereto, in example embodiments, the sensor can be small and only the magnet or the encoder arrangement has to be approximately as wide as the stroke. In this way, in such example embodiments, although more magnet material is required (although it is possible to use inexpensive plastic-bonded ferrite); on the other hand, these example embodiments manage with a minimally small sensor chip (which is significantly more expensive per area than the magnet).

In some further known rotation angle sensors, two sensors spaced apart spatially from one another are used: one is fitted laterally/radially and one lies on the axis of the shaft. That is firstly expensive and secondly inaccurate, since both sensors or the housings thereof are positioned/installed with considerable tolerances with respect to the shaft and with respect to the magnet. In example embodiments, in principle all direction components of the magnetic field that are to be detected can be detected by means of sensor elements which are arranged on a single semiconductor chip and thus oriented with micrometer accuracy with respect to one another. In a rotation angle sensor in accordance with the example embodiments, therefore, there is only one positional tolerance between magnet and chip, whereas there are at least two positional tolerances in the known rotation angle sensors mentioned. Furthermore, in these known arrangements, it is necessary to transmit at least some of the sensor signals from one chip to another chip or to a third chip, which is complicated with the wiring and, under certain circumstances, produces further inaccuracies.

Although some aspects have been described in connection with a device, it goes without saying that these aspects also represent a description of the corresponding method, such that a block or a component of a device should also be understood as a corresponding method step or as a feature of a method act. Analogously to this, aspects which have been described in connection with a or as a method act also represent a description of a corresponding block or detail or feature of a corresponding device. Some or all of the method acts can be performed by a hardware apparatus (or using a hardware apparatus), such as, for example, a microprocessor, a programmable computer or an electronic circuit. In some example embodiments, some or a plurality of the most important method acts can be performed by such an apparatus.

Depending on the specific implementation requirements, example embodiments of the disclosure can be implemented in hardware or in software. The implementation can be effected using a digital storage medium, for example a floppy disk, a DVD, a Blu-ray disk, a CD, a ROM, a PROM, an EPROM, an EEPROM or a flash memory, a hard disk or some other magnetic or optical storage device on which electronically readable control signals are stored which can interact or do interact with a programmable computer system in such a way that the respective method is carried out. Therefore, the digital storage medium can be computer-readable.

Some example embodiments according to the disclosure therefore comprise a data carrier having electronically readable control signals which are able to interact with a programmable computer system in such a way that one of the methods described herein is carried out.

Generally, example embodiments of the present disclosure can be implemented as a computer program product comprising a program code, wherein the program code is effective for carrying out one of the methods if the computer program product runs on a computer.

The program code can also be stored on a machine-readable carrier comprising a non-transitory medium, for example.

Other example embodiments comprise the computer program for carrying out one of the methods described herein, wherein the computer program is stored on a machine-readable carrier.

In other words, one example embodiment of the method according to the disclosure is therefore a computer program comprising a program code for carrying out one of the methods described herein if the computer program runs on a computer.

A further example embodiment of the methods according to the disclosure is therefore a data carrier (or a digital storage medium or a computer-readable medium) on which the computer program for carrying out one of the methods described herein is recorded.

A further example embodiment of the method according to the disclosure is therefore a data stream or a sequence of signals representing the computer program for carrying out one of the methods described herein. The data stream or the sequence of signals can be configured, for example, for being transferred via a data communication connection, for example via the Internet.

A further example embodiment comprises a processing device, for example a computer or a programmable logic component, which is configured or adapted for carrying out one of the methods described herein.

A further example embodiment comprises a computer on which the computer program for carrying out one of the methods described herein is installed.

A further example embodiment according to the disclosure comprises a device or a system designed to transmit a computer program for carrying out at least one of the methods described herein to a receiver. The transmission can be effected electronically or optically, for example. The receiver can be, for example, a computer, a mobile device, a memory device or a similar device. The device or the system can comprise, for example, a file server for transmitting the computer program to the receiver.

In some example embodiments, a programmable logic component (for example a field programmable gate array, an FPGA) can be used to carry out some or all functionalities of the methods described herein. In some example embodiments, a field programmable gate array can interact with a microprocessor in order to carry out one of the methods described herein. Generally, in some example embodiments the methods are carried out on the part of an arbitrary hardware device. The latter can be universally usable hardware such as a computer processor (CPU) or hardware specific to the method, such as an ASIC, for example.

The example embodiments described above merely constitute an illustration of the principles of the present disclosure. It goes without saying that modifications and variations of the arrangements and details described herein will be apparent to other persons skilled in the art. Therefore, it is intended that the disclosure should only be restricted by the scope of protection of the following patent claims and not by the specific details that have been presented on the basis of the description and the explanation of the example embodiments herein.

It can be seen in the detailed description above that various features are grouped together in example embodiments. This manner of disclosure should not be understood as the intention that the claimed example embodiments require more features than are explicitly mentioned in the respective claim. Rather, it is the case that inventive content can reside in fewer than all features of an individual example embodiment disclosed. Therefore, the following claims should hereby be deemed to be included in the description, wherein each claim can stand by itself as a separate example embodiment. Although each claim can stand by itself as a separate example embodiment, it should be noted that—although a dependent claim can refer in the claims to a specific combination with one or more claims—other example embodiments can also comprise or include a combination of this dependent claim with the subject matter of any other dependent claim or a combination of each feature with other dependent and independent claims. Such combinations are proposed herein, unless it is explicitly expressed that a specific combination is not intended. Furthermore, it is also intended that features of a claim can be included in any other independent claim even if this claim is not directly dependent on the independent claim.

It should furthermore be noted that methods disclosed in the description or in the claims can be implemented by a device having means for performing the respective steps or actions of said method. Furthermore, in some example embodiments, an individual act/action can be subdivided into a plurality of sub-acts or contain a plurality of sub-acts. Such sub-acts can be contained in the disclosure of the individual act and be part of the disclosure of the individual act.

The invention claimed is:

1. A rotation angle sensor for detecting an absolute rotation angle upon single or multiple revolutions with respect to an axis of rotation, comprising:
   a magnetic field sensor configured to detect at least two orthogonal variables of a magnetic field, wherein the variables are at least one of angle, absolute value or signed absolute value of the magnetic field detected by the magnetic field sensor; and
   an encoder arrangement, which is rotatable depending on the absolute rotation angle relative to the magnetic field sensor about the axis of rotation, such that at least one component of the magnetic field acting on the magnetic field sensor is dependent on a relative angular position and at least one other component orthogonal with respect thereto is dependent on a relative translational position of the encoder arrangement with respect to the magnetic field sensor, wherein the relative angular position and the relative translational position of the encoder arrangement with respect to the magnetic field sensor is determined from the at least two orthogonal variables of the magnetic field that are detected by the magnetic field sensor and the absolute rotation angle is determined by means of the relative angular position and the relative translational position.

2. The rotation angle sensor as claimed in claim 1, wherein the encoder arrangement is offset with respect to the magnetic field sensor radially relative to the axis of rotation.

3. The rotation angle sensor as claimed in claim 1, wherein the encoder arrangement is displaceable translationally depending on the absolute rotation angle, such that the relative translational position of the encoder arrangement is dependent on the absolute rotation angle.

4. The rotation angle sensor as claimed in claim 1, further comprising evaluation electronics configured to determine the relative angular position and the relative translational position from the at least two orthogonal variables detected by the magnetic field sensor, and determine the absolute rotation angle from the relative angular position and the relative translational position.

5. The rotation angle sensor as claimed in claim 1, wherein the encoder arrangement comprises at least four encoder elements, such that the encoder arrangement has at least two magnetic periods in a circumferential direction.

6. The rotation angle sensor as claimed in claim 1, wherein an air gap separates the encoder arrangement and the magnetic field sensor from one another at least in a radial direction.

7. The rotation angle sensor as claimed in claim 1, wherein the encoder arrangement is displaceable translationally relative to the magnetic field sensor in an axial direction, in a radial direction or in an axial and a radial direction.

8. The rotation angle sensor as claimed in claim 1, further comprising a gear mechanism configured to produce the relative translational position of the encoder arrangement with respect to the magnetic field sensor depending on the absolute rotation angle.

9. The rotation angle sensor as claimed in claim 8, wherein the gear mechanism is a spindle drive, a helical gear mechanism, a spiral gear mechanism, an eccentric gear mechanism or a crank gear mechanism.

10. The rotation angle sensor as claimed in claim 1, wherein the encoder arrangement is embodied as a permanent-magnetic multipole wheel.

11. The rotation angle sensor as claimed in claim 1, wherein the encoder arrangement comprises a ring composed of magnetic material and a multiplicity of permanent magnets arranged on the ring.

12. The rotation angle sensor as claimed in claim 1, wherein the encoder arrangement is a passive soft-magnetic encoder wheel designed for interaction with at least one back-bias magnet.

13. The rotation angle sensor as claimed in claim 1, wherein the magnetic field sensor comprises a semiconductor chip, which comprises a first sensor element configured to detect a first variable of the magnetic field and a second sensor element configured to detect a second variable of the magnetic field.

14. A rotation angle sensor for detecting an absolute rotation angle upon single or multiple revolutions with respect to an axis of rotation, comprising:
a magnetic field sensor configured to detect at least two orthogonal variables of a magnetic field, wherein the variables are at least one of angle, absolute value or signed absolute value of the detected magnetic field; and
an encoder arrangement having at least four encoder elements, wherein the encoder arrangement is rotatable depending on the absolute rotation angle relative to the magnetic field sensor about the axis of rotation, such that at least one component of the magnetic field acting on the magnetic field sensor is dependent on a relative angular position and another component orthogonal with respect thereto is dependent on a relative translational position of the encoder arrangement with respect to the magnetic field sensor;
wherein the relative angular position and the relative translational position of the encoder arrangement with respect to the magnetic field sensor can be determined from the at least two orthogonal variables of the magnetic field that are detected by the magnetic field sensor and the absolute rotation angle can be determined by means of the relative angular position and the relative translational position.

15. The rotation angle sensor as claimed in claim 14, further comprising evaluation electronics configured to determine the relative angular position and the relative translational position from the at least two orthogonal variables detected by the magnetic field sensor, and determine the absolute rotation angle from the relative angular position and the relative translational position.

16. The rotation angle sensor as claimed in claim 14, wherein an air gap separates the encoder arrangement and the magnetic field sensor from one another at least in a radial direction.

17. The rotation angle sensor as claimed in claim 14, wherein the encoder arrangement is displaceable translationally relative to the magnetic field sensor in an axial direction, in a radial direction or in an axial and a radial direction.

18. The rotation angle sensor as claimed in claim 14, further comprising a gear mechanism configured to produce the relative translational position of the encoder arrangement with respect to the magnetic field sensor depending on the absolute rotation angle.

19. The rotation angle sensor as claimed in claim 18, wherein the gear mechanism is a spindle drive, a helical gear mechanism, a spiral gear mechanism, an eccentric gear mechanism or a crank gear mechanism.

20. The rotation angle sensor as claimed in claim 14, wherein the encoder arrangement is embodied as a permanent-magnetic multipole wheel.

21. The rotation angle sensor as claimed in claim 14, wherein the encoder arrangement comprises a ring composed of magnetic material and a multiplicity of permanent magnets arranged on the ring.

22. The rotation angle sensor as claimed in claim 14, wherein the encoder arrangement is a passive encoder wheel designed for interaction with at least one back-bias magnet.

23. The rotation angle sensor as claimed in claim 14, wherein the magnetic field sensor comprises a semiconductor chip, which comprises a first sensor element for a first variable of the magnetic field and a second sensor element for a second variable of the magnetic field.

24. A method for determining an absolute rotation angle, comprising:

receiving a first sensor signal and a second sensor signal from a magnetic field sensor, wherein the first sensor signal and the second sensor signal represent two orthogonal variables of a magnetic field detected by the magnetic field sensor;

determining a relative translational position of an encoder arrangement with respect to the magnetic field sensor by evaluating at least the first sensor signal;

determining a relative angular position of the encoder arrangement with respect to the magnetic field sensor by evaluating at least the second sensor signal; and determining the absolute rotation angle based on the relative translational position determined and the relative angular position determined, wherein the magnetic field sensor is part of a rotation angle sensor, comprising:

the magnetic field sensor configured to detect the at least two orthogonal variables of the magnetic field, wherein the variables are at least one of angle, absolute value or signed absolute value of the magnetic field detected by the magnetic field sensor; and the encoder arrangement, which is rotatable depending on the absolute rotation angle relative to the magnetic field sensor about the axis of rotation, such that at least one component of the magnetic field acting on the magnetic field sensor is dependent on the relative angular position and the at least one other component orthogonal with respect thereto is dependent on the relative translational position of the encoder arrangement with respect to the magnetic field sensor, wherein the relative angular position and the relative translational position of the encoder arrangement with respect to the magnetic field sensor is determined from the at least two orthogonal variables of the magnetic field that are detected by the magnetic field sensor and the absolute rotation angle is determined by means of the relative angular position and the relative translational position.

25. The method as claimed in claim 24, wherein determining the relative translational position is effected by jointly evaluating the first sensor signal and the second sensor signal.

26. The method as claimed in claim 25, wherein jointly evaluating the first sensor signal and the second sensor signal comprises determining a ratio of the first sensor signal to the second sensor signal, wherein the ratio is independent of the relative angular position.

27. The method as claimed in claim 25,
wherein determining the relative angular position is effected prior to determining the relative translational position; and
wherein jointly evaluating the first sensor signal and the second sensor signal uses a result of determining the translational angular position.

28. The method as claimed in claim 24, wherein at least one of the steps of determining the relative translational position, determining the relative angular position and determining the absolute rotation angle uses a CORDIC algorithm (COordinate Rotation Digital Computer).

29. The method as claimed in claim 24, wherein at least one of determining the relative translational position and determining the relative angular position uses a third sensor signal, which corresponds to a third orthogonal variable of the magnetic field detected by the magnetic field sensor.

30. The method as claimed in claim 24,
wherein the magnetic field sensor interacts with a magnetic encoder arrangement, which is displaceable translationally and rotatable depending on the absolute rotation angle relative to the magnetic field sensor about the axis of rotation, such that the magnetic field detected by the magnetic field sensor is dependent on a relative angular position and a relative translational position of the encoder arrangement with respect to the magnetic field sensor, and wherein a tangential variable $B_\psi$, a radial variable $B_r$ and an axial variable $B_z$ of the magnetic field are given by:

$$B_\psi = \hat{B}_\psi \sin(p\psi),$$

$$\hat{B}_\psi = \frac{4B_{rem}}{\pi} \sinh\left(\frac{\pi t}{\lambda}\right) \cos\left(lf\frac{\pi}{2}\right) \exp\left(-\pi\frac{2g+t}{\lambda}\right)$$

$$B_r = \hat{B}_r \cos(p\psi)$$

$$\hat{B}_r = \frac{4B_{rem}}{\pi} \sinh\left(\frac{\pi t}{\lambda}\right) \cos\left(\frac{\pi lf}{2}\right) \exp\left(-\pi\frac{2g+t}{\lambda}\right)$$

$$B_z = \hat{B}_z \cos(p\psi),$$

$$\hat{B}_z = \frac{2B_{rem}}{\pi^2} \cos\left(\frac{\pi}{2}lf\right) \left\{ \begin{array}{l} K_0\left(\frac{\pi}{\lambda}\sqrt{(2z-w)^2+(2g)^2}\right)-- \\ K_0\left(\frac{\pi}{\lambda}\sqrt{(2z+w)^2+(2g)^2}\right) \end{array} \right\}$$

wherein
$B_{rem}$ is a remanent field strength of the encoder arrangement or of an encoder element;
p is a number of pole pairs of the encoder arrangement;
r is a radius between the axis of rotation and the magnetic field sensor;
λ is a magnetic period of the encoder arrangement, wherein the following holds true:

$$\lambda = 2 * \Pi * r / p;$$

If is a percentage of the non-magnetized volume with respect to the total volume enclosed by the encoder arrangement;
g is a width of an air gap between the encoder arrangement and the magnetic field sensor;
$K_0$ is the modified Bessel function;
t is a magnetically active radial extent of the encoder arrangement;
w is an axial extent of the encoder arrangement; and
sgn(z) is z/|z|.

31. A non-transitory computer readable medium containing a computer program comprising a program code for carrying out the method as claimed in claim 24 if the program is executed on a computer.

* * * * *